(12) United States Patent
Song et al.

(10) Patent No.: US 12,001,096 B2
(45) Date of Patent: Jun. 4, 2024

(54) BACKLIGHT MODULE, ASSEMBLY METHOD OF BACKLIGHT MODULE, AND DISPLAY DEVICE

(71) Applicants: MIANYANG HKC OPTOELECTRONICS TECHNOLOGY CO., LTD., Sichuan (CN); HKC CORPORATION LIMITED, Shenzhen (CN)

(72) Inventors: Danwang Song, Sichuan (CN); Baohong Kang, Sichuan (CN)

(73) Assignees: MIANYANG HKC OPTOELECTRONICS TECHNOLOGY CO., LTD., Mianyang (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/090,636

(22) Filed: Dec. 29, 2022

(65) Prior Publication Data

US 2023/0341724 A1 Oct. 26, 2023

(30) Foreign Application Priority Data

Apr. 21, 2022 (CN) .......................... 202210422273.X

(51) Int. Cl.
*G02F 1/13357* (2006.01)

(52) U.S. Cl.
CPC .. *G02F 1/133603* (2013.01); *G02F 1/133605* (2013.01)

(58) Field of Classification Search
CPC ......... G02F 1/133603; G02F 1/133605; G02F 1/133615
See application file for complete search history.

(56) References Cited

U.S. PATENT DOCUMENTS

| 2014/0160791 A1* | 6/2014 | Guo | ..................... G02B 6/0073 362/609 |
| 2021/0223628 A1* | 7/2021 | Zhang | ............... G02F 1/133608 |

(Continued)

FOREIGN PATENT DOCUMENTS

| CN | 103032766 A | 4/2013 |
| CN | 103591559 A | 2/2014 |

(Continued)

OTHER PUBLICATIONS

Wang et al. CN113721388A machine translation 2021 (Year: 2021).*

(Continued)

*Primary Examiner* — Tracie Y Green
(74) *Attorney, Agent, or Firm* — HAUPTMAN HAM, LLP

(57) ABSTRACT

A backlight module, an assembly method of the backlight module, and a display device are provided in the disclosure. The backlight module includes a backplane, a light bar, a light-guide plate, a reflective sheet fixed on a first side of the backplane, and an adhesive layer. The light bar includes a circuit board and multiple light sources. The circuit board has a first region and a second region connected with the first region. The multiple light sources are fixed on the first region. The adhesive layer is fixed on the second region. The light-guide plate is at least partially fixed on the second region via the adhesive layer. The light bar and the light-guide plate are both mounted on the first side of the backplane. The reflective sheet is between the backplane and the light-guide plate.

19 Claims, 24 Drawing Sheets

(56) References Cited

U.S. PATENT DOCUMENTS

2022/0120957 A1\* 4/2022 Zhang .................... H05K 1/028
2022/0145134 A1\* 5/2022 Sun ........................... C09J 7/22

FOREIGN PATENT DOCUMENTS

| CN | 204807879 U | 11/2015 |
| CN | 206057758 U | 3/2017 |
| CN | 108132562 A | 6/2018 |
| CN | 211124787 U | 7/2020 |
| CN | 113721387 A \* | 11/2021 |
| CN | 113721388 A | 11/2021 |

OTHER PUBLICATIONS

Liu et al. CN 204807879 U, machine translation 2015 (Year: 2015).\*
Lin et al. CN113721387A machine translation (Year: 2021).\*

\* cited by examiner

LED Model : 3806#
Exposed part of : 3.2mm
Light-emitting Surface

LED Model : 4014#
Exposed part of : 3.48mm
Light-emitting Surface

LED Model : 7020#
Exposed part of : 6.30mm
Light-emitting Surface

BACKLIGHT MODULE, ASSEMBLY METHOD OF BACKLIGHT MODULE, AND DISPLAY DEVICE

CROSS-REFERENCE TO RELATED APPLICATIONS

This application claims priority under 35 U.S.C. § 119(a) to Chinese Patent Application No. 202210422273.X, filed Apr. 21, 2022, the entire disclosure of which is incorporated herein by reference.

TECHNICAL FIELD

This disclosure relates to the field of liquid crystal display, in particular, to a backlight module, an assembly method of the backlight module, and a display device.

BACKGROUND

Currently, liquid crystal display modules (LCMs) are mostly manually assembled. An LCM assembly line requires at least fifteen to twenty people for manual assembly. With the improvement of equipment automation capabilities, an LCM automatic assembly has become feasible, and LCM assembly has gradually changed from manual assembly to automatic assembly. However, at present, an insertion position of a light bar of the LCM assembled by automatic equipment is inaccurate, which leads to a decrease in an optical quality of the assembled LCM. Therefore, it is necessary to change a method for fixing and assembling part of structures of the LCM to improve a product yield of automatic assembly.

SUMMARY

In a first aspect, a backlight module is provided in embodiments of the disclosure. The backlight module includes a backplane, a light bar, a light-guide plate, a reflective sheet fixed on a first side of the backplane, and an adhesive layer. The light bar includes a circuit board and multiple light sources. The circuit board has a first region and a second region connected with the first region. The multiple light sources are fixed on the first region. The adhesive layer is fixed on the second region. The light-guide plate is at least partially fixed on the second region via the adhesive layer. The light bar and the light-guide plate are both mounted on the first side of the backplane. The reflective sheet is between the backplane and the light-guide plate.

In a second aspect, a display device is further provided. The display device includes a display panel and the backlight module provided in the first aspect, where the display panel is disposed on a light-emitting side of the backlight module.

In a third aspect, an assembly method of a backlight module is further provided in the disclosure. The assembly method includes the following. A reflective sheet is fixed on a first side of a backplane. An adhesive is dispersed on a light bar to form an adhesive layer. A light-guide plate is attached to the adhesive layer to fix at least part of the light-guide plate on the light bar. The light bar and the light-guide plate are mounted on the first side of the backplane and the reflective sheet is disposed between the backplane and the light-guide plate.

BRIEF DESCRIPTION OF THE DRAWINGS

In order to describe technical solutions in embodiments of the disclosure or the related art more clearly, the accompanying drawings required for the embodiments of the disclosure or the related art will be described below.

DETAILED DESCRIPTION

Figure 1:
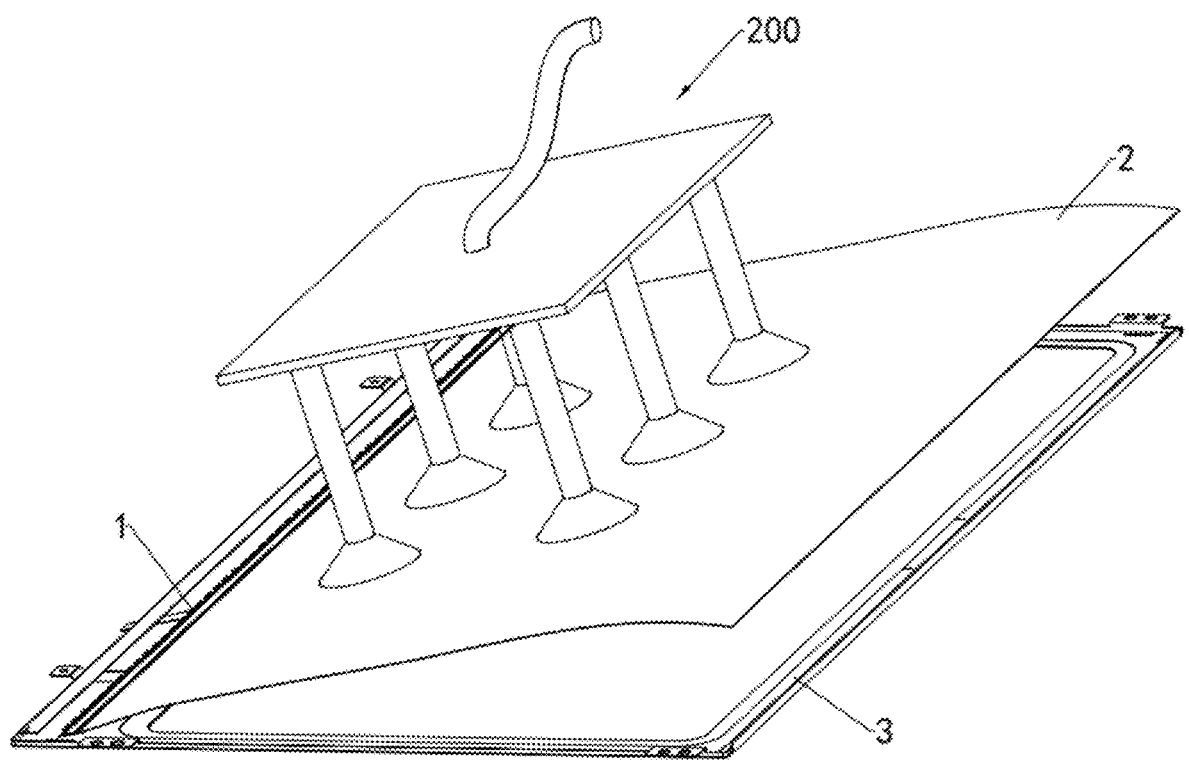
FIG. 1 is a schematic diagram illustrating part of an assembly process of an assembly method of a backlight module in the related art.

Technical solutions in embodiments of the disclosure are described hereinafter with reference to the accompanying drawings in the embodiments of the disclosure. It is noted that, in the embodiments of the disclosure, terms "mounting" and "connecting" should be understood in a broad sense unless otherwise explicitly specified and limited. For example, the term "connecting" may be a detachable connecting, or a non-detachable connecting, and may also be a direct connecting, or an indirect connecting through a medium. In the embodiments of the disclosure, terms "first", "second", and "third" are merely for descriptive purposes, and should not be understood as indicating or implying relative importance or implicitly indicating the number of technical features indicated. As such, the feature defined with the term "first", "second", or "third" may explicitly or implicitly include one or more of the features. In the embodiments of the disclosure, the term "and/or" only describes an association relationship between associated objects, which indicates that there may be three relationships, for example, A and/or B may indicate A alone, both A and B, or B alone. In addition, the character "/" referred to herein generally indicates that the associated objects are in an "or" relationship.

It can be understood that the embodiments described herein are only for explaining rather than limiting relevant embodiments. It is also noted that, for ease of description, only parts related to the embodiments are illustrated in the drawings.

It is noted that, the embodiments in the disclosure as well as features in the embodiments can be combined with each other without inconsistency.

A backlight module, an assembly method of the backlight module, and a display device including the backlight module are provided in embodiments of the disclosure, and a product yield of automatic assembly is improved by changing a method for fixing and assembling part of structures of the backlight module.

Refer to FIG. 1, which is a schematic diagram illustrating part of an assembly process of a backlight module in the related art.

In an automatic assembly process of an backlight module in the related art, generally, a light bar 1 and a reflective sheet 2 are firstly fixed together to form a lamp-reflective assembly, and a sucker 200 suctions up the reflective sheet 2 to move the lamp-reflective assembly to a backplane 3, the sucker 200 then brings the lamp-reflective assembly to tilt at an angle to insert the light bar 1, so as to fix the lamp-reflective assembly to the backplane 3. However, when the sucker 200 suctions up the reflective sheet 2, edges of the reflective sheet 2 sags (as illustrated in FIG. 1) due to a soft texture of the reflective sheet 2, and the lamp-reflective assembly deforms, which makes a tilt angle uncontrollable, affects inserting the lamp-reflective assembly, and causes a failure of mounting the lamp-reflective assembly to an accurate position of the backplane 3, and thus the product yield is lowered.

An assembly method of a backlight module provided in the disclosure improves a mounting accuracy of parts and the product yield by changing a method for fixing and assembling of part of structures of the backlight module.

Figure 2:
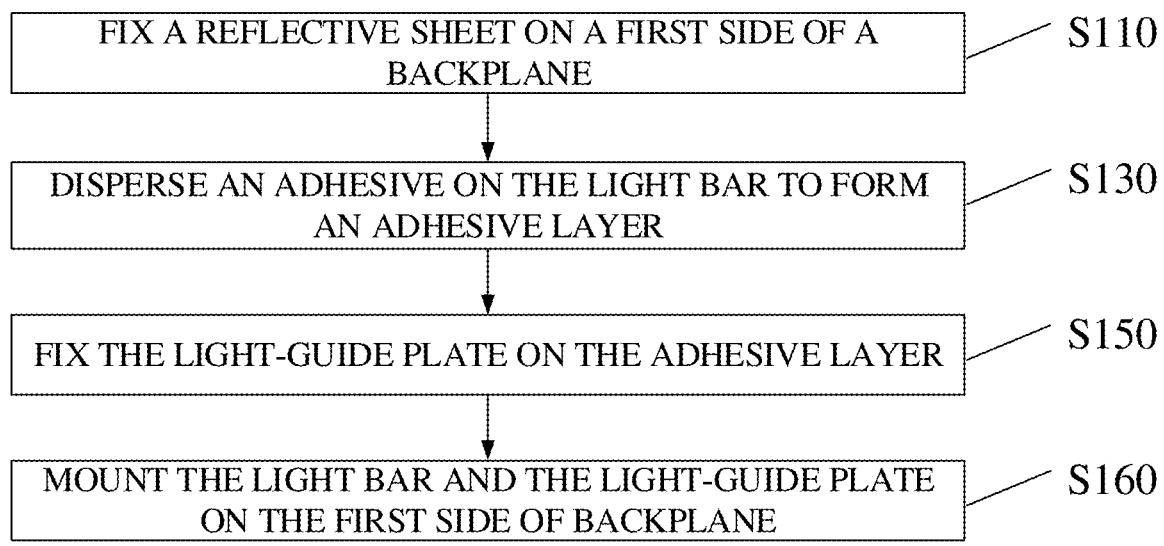
FIG. 2 is a schematic flow chart of an assembly method of a backlight module provided in embodiments of the disclosure.

Refer to FIG. 2, which is a schematic flow chart of an assembly method of a backlight module provided in the embodiments of the disclosure.

The assembly method of the backlight module in this embodiment can begin at S110.

At S110, fix a reflective sheet on a first side of a backplane.

Figure 3:
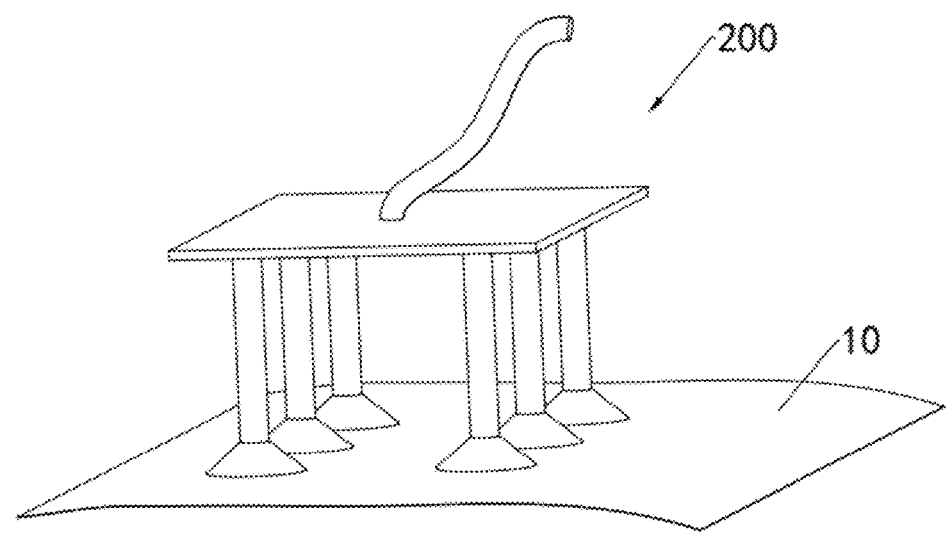
FIGS. 3-8 are schematic diagrams illustrating part of an assembly process of the assembly method illustrated in FIG. 2.
Figure 3:
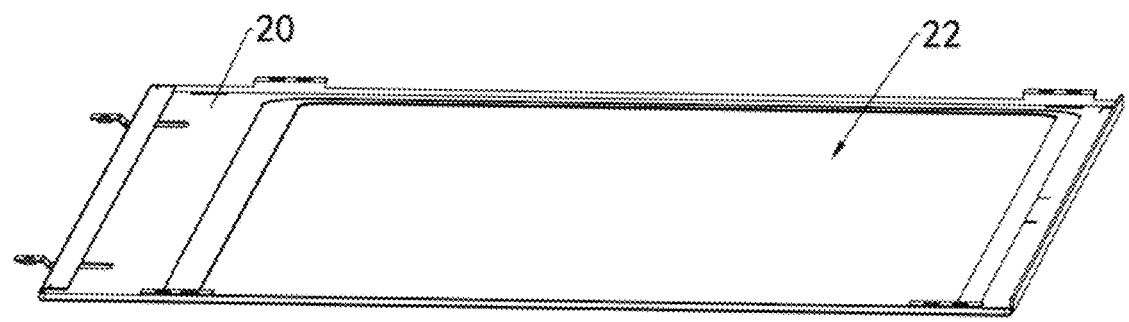

Specifically, refer to FIG. 3, in this embodiment, a sucker 200 firstly suctions up a reflective sheet 10, and brings the reflective sheet 10 to move to be directly above the first side 22 of the backplane 20, and then the sucker 200 vertically descends to fix the reflective sheet 10 on the first side 22 of the backplane 20. The sucker 200 moves in a vertical direction during mounting the reflective sheet 10, thus an eventual fixed position of the reflective sheet 10 will not be offset even if the edges of the reflective sheet 10 deform after the sucker 200 suctions up the reflective sheet 10, that is, an optical quality of the product will not be affected.

Figure 4:
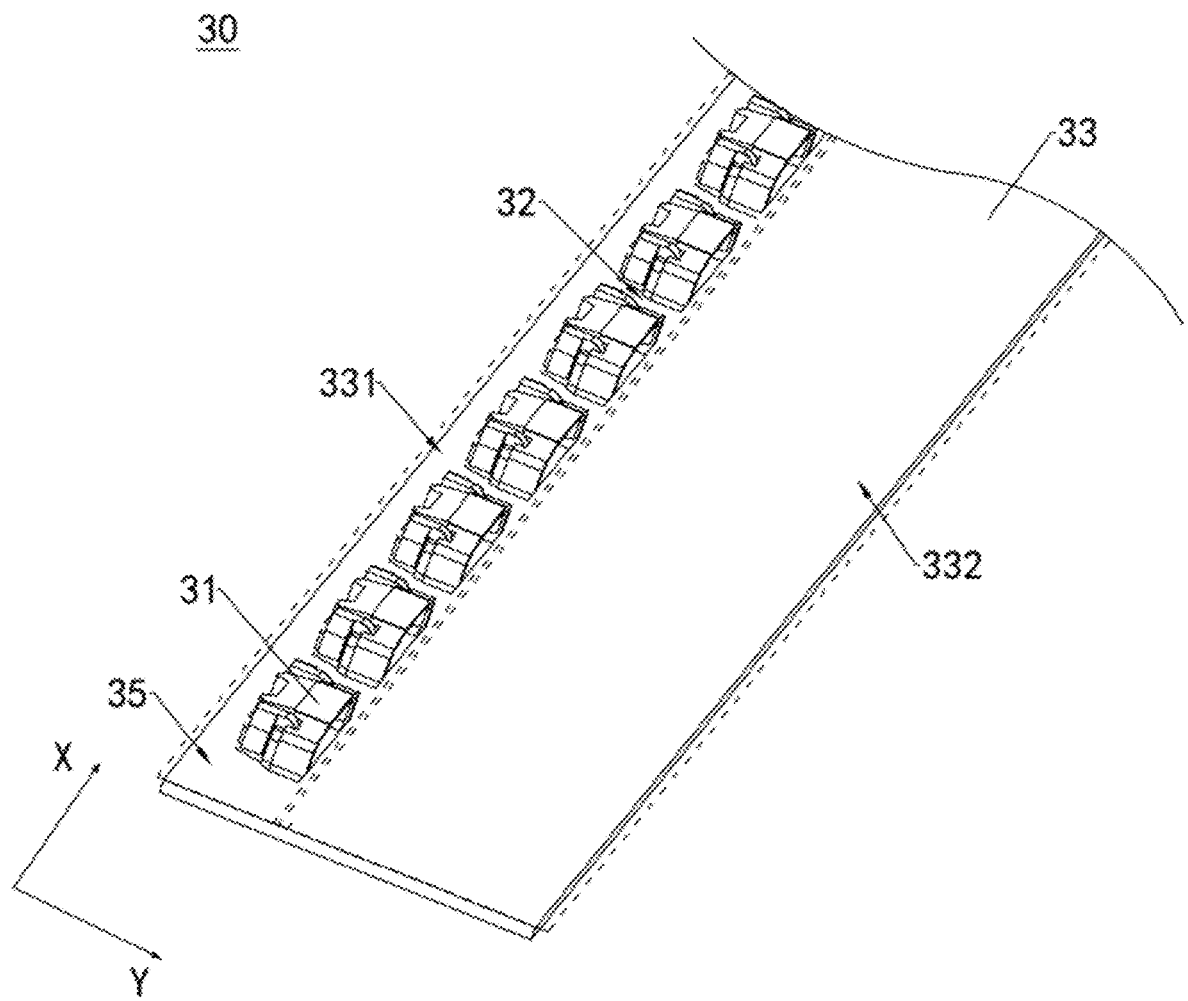
Figure 5:
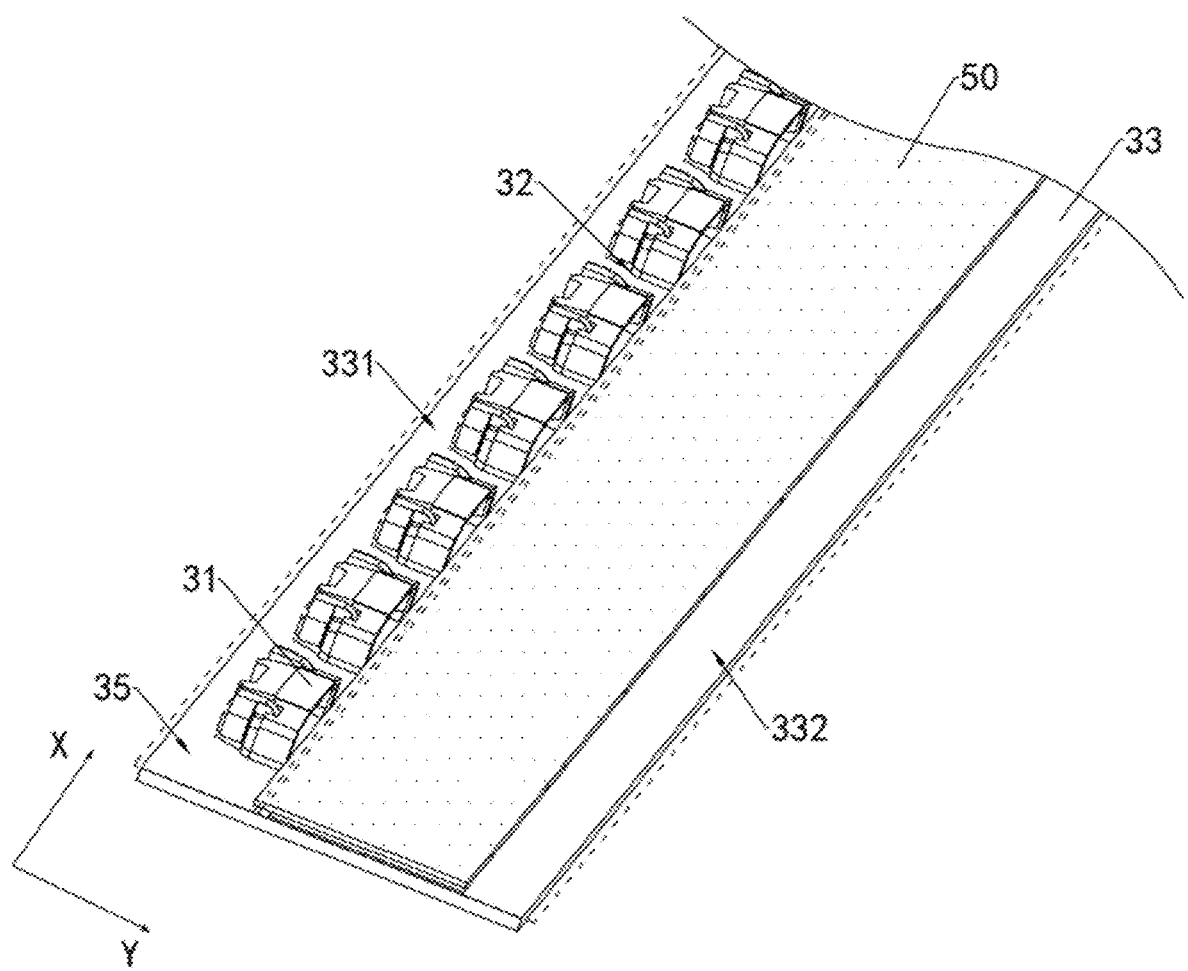

At S130, disperse an adhesive on the light bar to form an adhesive layer 50. Specifically, refer to FIG. 4 and FIG. 5 together, in this embodiment, the light bar 30 includes a circuit board 33 and multiple light sources 31. The circuit board 33 may has a first region 331 and a second region 332 connected with the first region 331. In an embodiment, S130 includes forming the adhesive layer 50 on the second region 332. The circuit board 33 extends in a first direction (that is, X direction as illustrated in FIG. 4 and FIG. 5). A width direction of the circuit board 33 is a second direction (that is, Y direction as illustrated in FIG. 4 and FIG. 5). The first region 331 and the second region 332 are arranged in the second direction. The multiple light sources 31 are arranged in the first direction and are all fixed on the first region 331 of the circuit board 33. In an example, each two adjacent light sources 31a in the multiple light sources 31 define a gap 32 therebetween to form multiple gaps 32. Each of the light sources 31 at both ends in the first direction and an edge of a corresponding one of both ends of the circuit board 33 in the first direction define a gap 35 therebetween. The adhesive layer 50 is fixed on the second region 332 of the circuit board 33.

In some embodiments, the light source 31 may be a light-emitting diode (LED). The adhesive layer 50 may be a preformed adhesive tape, which can be directly fixed on the light bar 30. In some other embodiments, the adhesive layer 50 may also be a liquid glue, which is fixed on the light bar 30 by means of dispensing, and then cured and formed, which is not limited herein.

At S150, fix the light-guide plate on the adhesive layer, such that the light-guide plate is at least partially fixed on the light bar.

Figure 6:
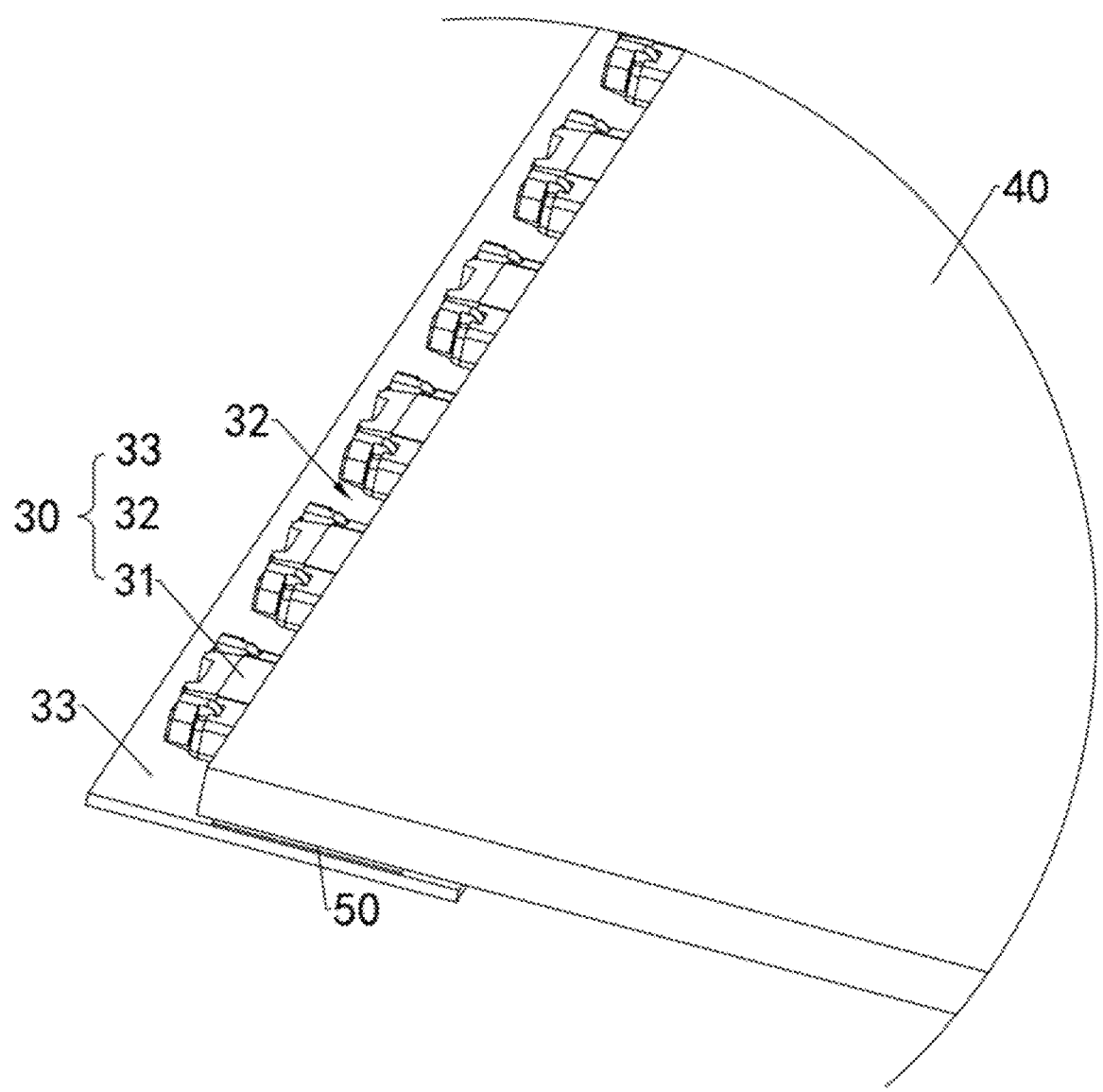

Specifically, refer to FIG. 6, in this embodiment, the light-guide plate 40 is fixed on a surface of the adhesive layer 50 away from the circuit board 33, such that the light-guide plate 40 is at least partially fixed on the light bar 30. At this time, the light bar 30 and the light-guide plate 40 constitute a lamp-guide assembly.

In some embodiments, the adhesive layer 50 is a molding tape with a release film. Thus, the release film of the tape needs to be peeled off before fixing the light-guide plate 40, so as to expose out an adhesive portion of the tape to fix the light-guide plate 40.

At S160, mount the light bar and the light-guide plate on the first side of backplane, where the reflective sheet is between backplane and light-guide plate.

Figure 7:
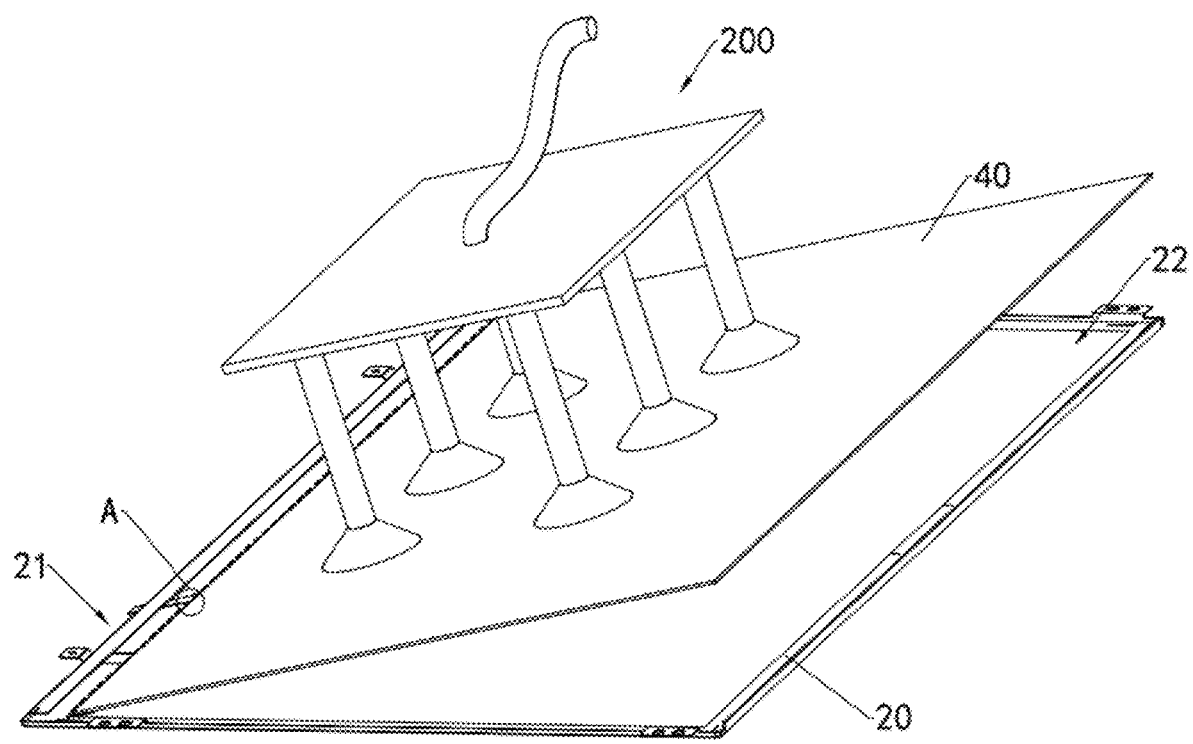
Figure 8:
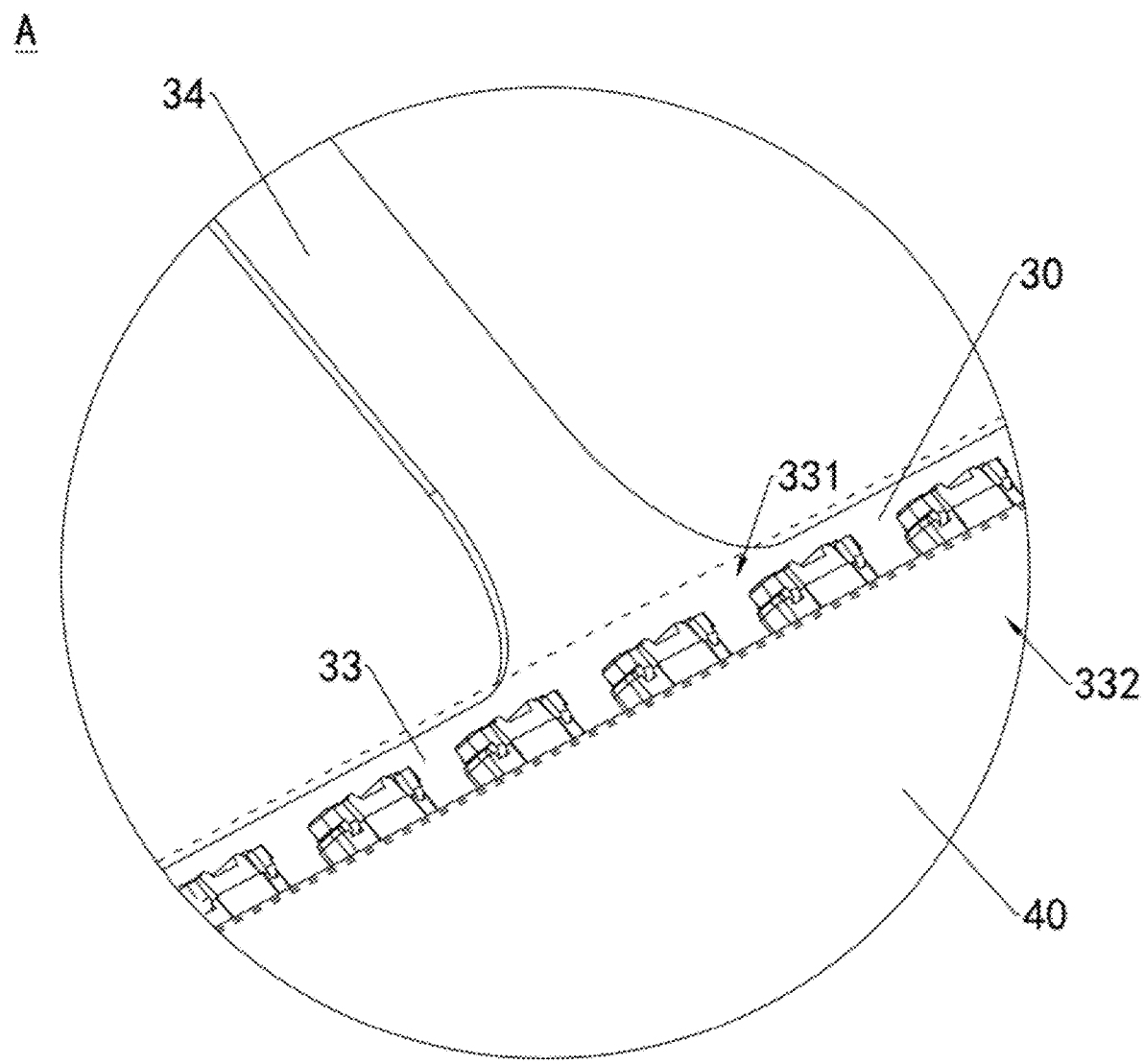

Specifically, refer to FIG. 7 and FIG. 8, in this embodiment, the backplane 20 defines a jack 21 on a side of the backplane 20. The light bar 30 further includes a plug wire 34. The plug wire 34 is connected to a side of the first region 331 of the circuit board 33 away from the second region 332. In an implementation, the plug wire 34 and the circuit board 33 can be integrally formed. The sucker 200 can suction up the light-guide plate 40 to move the light-guide assembly to be above the backplane 20. The sucker 200 brings the lamp-guide assembly to tilt at an angle, and inserts the plug wire 34 into the jack 21 to fix the lamp-guide assembly on the first side 22 of the backplane 20.

It is noted that, in the assembly method of the backlight module provided in the disclosure, the light bar 30 and the light-guide plate 40 are firstly fixed together to form a lamp-guide assembly, and the sucker 200 is used to suction up the light-guide plate 40 to suction up the entire lamp-guide assembly for the overall installation operation. The light-guide plate 40 has a relatively hard texture and high strength, thus when the sucker 200 suctions up the light-guide plate 40 to suction up the lamp-guide assembly, the lamp-guide assembly is not easy to deform, which allows the lamp-guide assembly to have a controllable tilt angle when being tilted under the control of the sucker 200, and more accurate alignment is achieved, so that the plug wire 34 of the lamp-guide assembly can be accurately inserted into the jack 21 of the backplane 20, which is beneficial to improving the product yield. At the same time, the assembly method of the backlight module of the disclosure is simplified, the reflective sheet and the lamp-guide assembly are mounted on the backplane with aid of the sucker, which has a high assembly yield and meets requirements of automatic assembly, and thus a problem of a low optical quality of the backlight module caused during an automatic assembly process is effectively avoided, product optimization is realized, and production efficiency is further improved.

It is noted that a sequence of S110 and S120 to S140 in this embodiment can be changed. In other words, the lamp-guide assembly can be assembled before or after the reflective sheet 10 is fixed on the backplane 20, which is not limited herein.

Figure 9A:
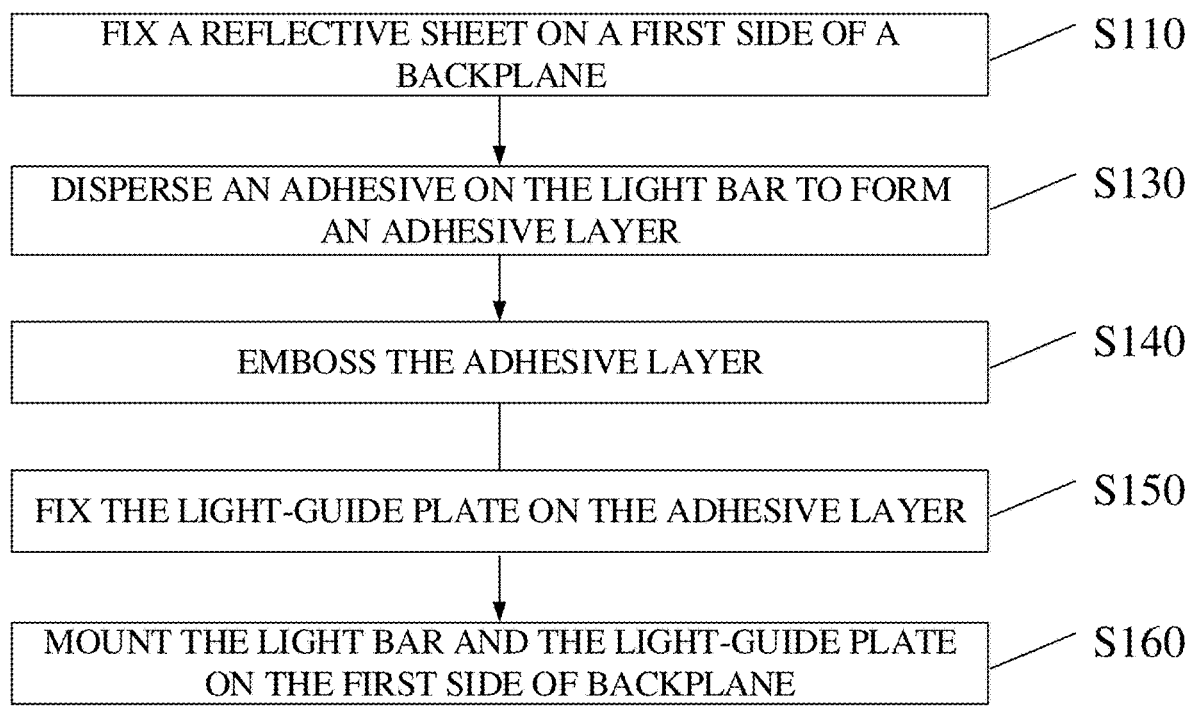
FIG. 9A is a schematic flow chart of the assembly method illustrated in FIG. 2 in some embodiments.

Refer to FIG. 9A, which is a schematic flow chart of the assembly method illustrated in FIG. 2 in some embodiments.

In some embodiments, the assembly method of the backlight module may further include S140. At S140, emboss the adhesive layer 50.

Figure 9B:
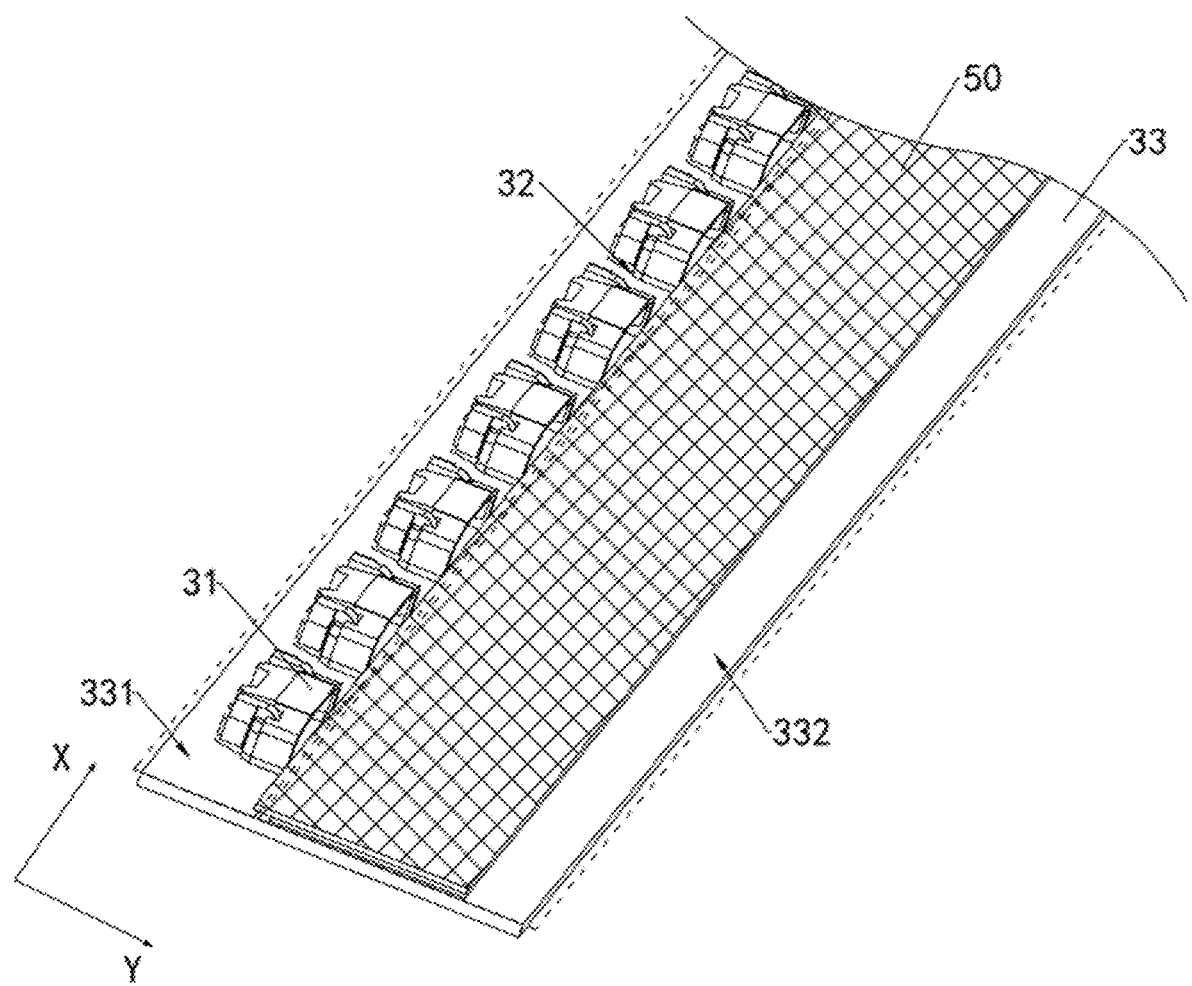
FIG. 9B is a schematic diagram illustrating part of an assembly process of the assembly method illustrated in FIG. 9A.

Specifically, refer to FIG. 9B, the adhesive layer 50 is embossed by equipment to form embossing. In an example, the embossing may be in a shape of horizontal bars, vertical bars, or rhombus. A shape of the embossing of the adhesive layer 50 is not limited herein.

It can be understood that, when fixing the light-guide plate to the light bar 30, it is required to firstly tilt the light-guide plate at an angle to align an edge of the light-guide plate with the second region 332, and then fix the light-guide plate to the light bar 30. As a result, part of the adhesive layer 50 is easily squeezed by the light-guide plate 40 to gather together, and thus the adhesive layer 50 has an uneven thickness and an uneven surface, which affects a subsequent fixation of the light-guide plate 40. In the assembly method of the disclosure, gaps are defined in an adhesive body of the adhesive layer 50 by embossing the adhesive layer 50, such that even if the adhesive layer 50 is subsequently squeezed by the light-guide plate, squeezed parts of the adhesive body can fill the gaps in the embossing, and thus an uneven thickness is avoided, which is beneficial to improving a fixing strength of the light-guide plate and the product yield.

It is noted that, a sequence of S130 and S140 can be changed. In other words, embossing can be performed before or after the adhesive layer 50 is fixed to the light bar 30. Alternatively, in other embodiments, the adhesive layer 50 may be a preformed tape with embossing, which is not limited herein.

Figure 10A:
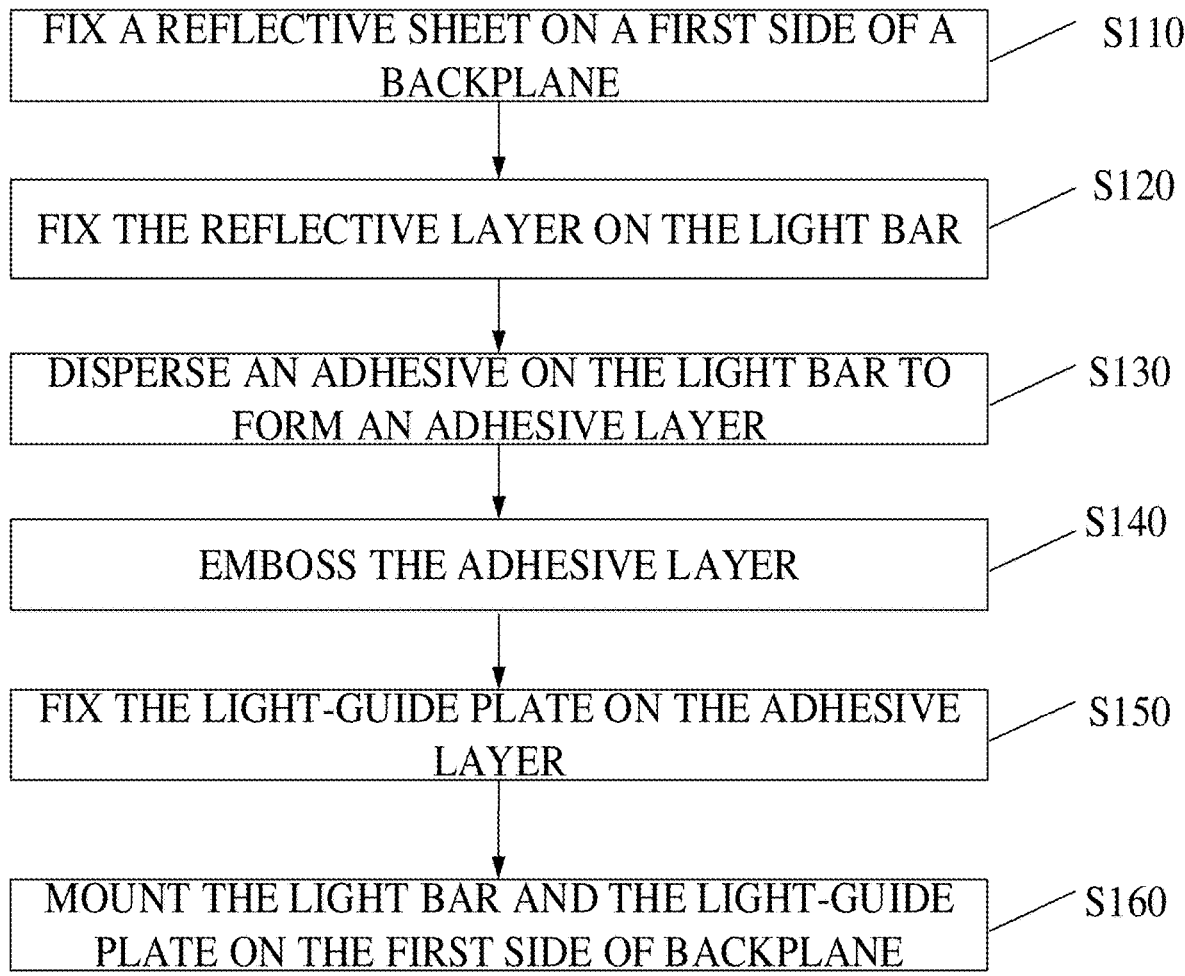
FIG. 10A is a schematic flow chart of the assembly method illustrated in FIG. 2 in other embodiments.

Refer to FIG. 10A, which is a schematic flow chart of the assembly method illustrated in FIG. 2 in other embodiments.

In other embodiments, the assembly method of the backlight module may further include S120. At S120, fix the reflective layer on the light bar.

Figure 10B:
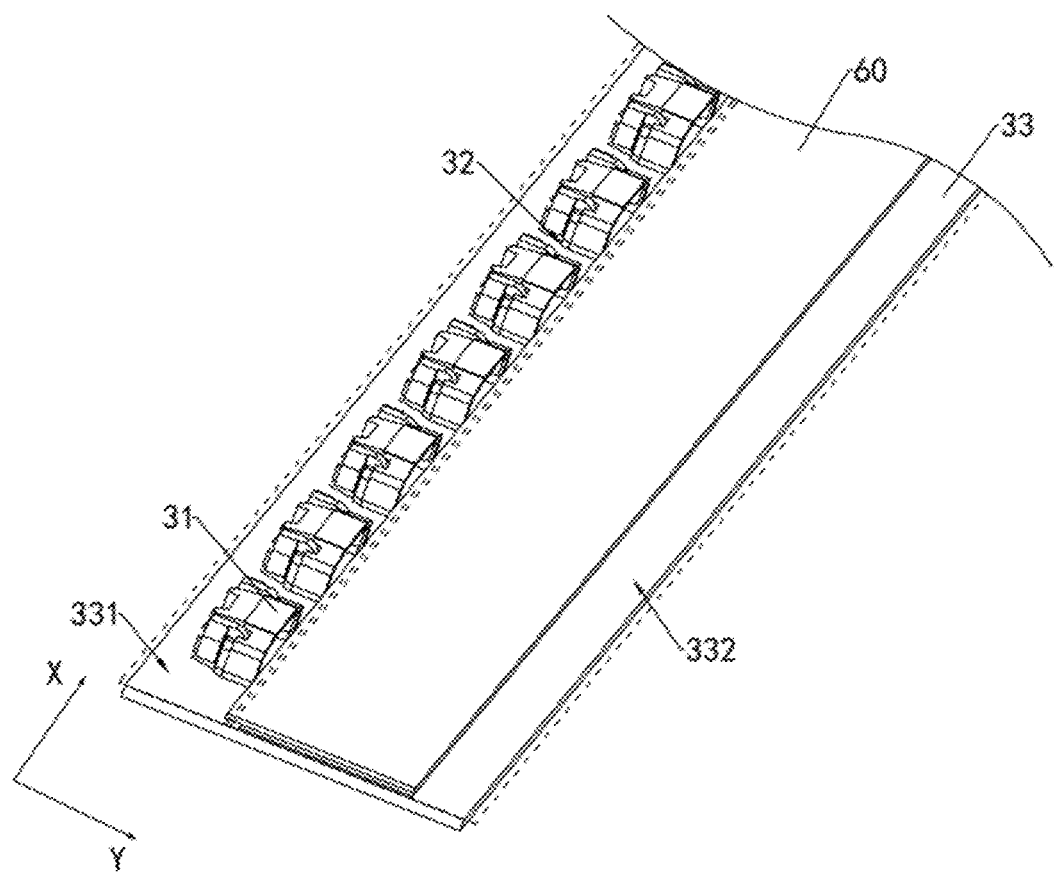
FIG. 10B is a schematic diagram illustrating part of an assembly process of the assembly method illustrated in FIG. 10A.

Specifically, please refer to FIG. 10B, in some embodiments, the assembly method may include fixing the reflective layer 60 on the second region 332 of the circuit board 33 of the light bar 30. In an example, the reflective layer 60 has a white surface. It is noted that, since the entire surface of the reflective layer 60 has a color of white, part of light rays emitted from the light source can be reflected by the reflective layer 60 to enter the light-guide plate, effectively reducing a brightness loss of the backlight module and improving the optical quality of the product. In other embodiments, the reflective layer 60 may also have a color with a relatively high reflective efficiency such as gray or silver, which is not limited herein.

In an implementation, forming the adhesive layer 50 on the second region 332 may include forming the adhesive layer 50 on the reflective layer 60 that is fixed on the second region 332.

It is noted that, in the assembly method of the backlight module of the disclosure, S120 is optional, and can be added or deleted according to actual situations, which is not limited herein.

Figure 11:
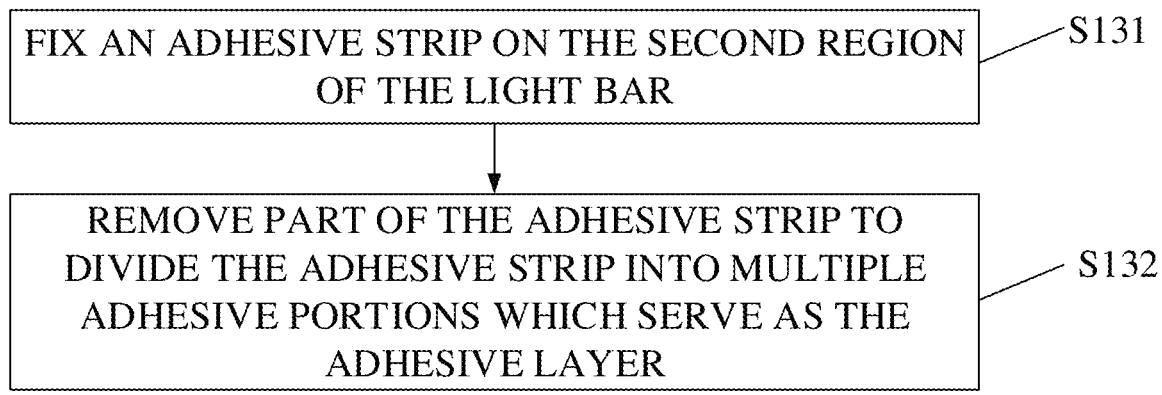
FIG. 11 is a schematic flow chart of the assembly method illustrated in FIG. 10A in some embodiments.

Refer to FIG. 11, which is a schematic flow chart of the assembly method illustrated in FIG. 10A in some embodiments.

In some embodiments, at S130, disperse an adhesive on the light bar to form an adhesive layer. S130 may include S131 and S132.

At S131, fix an adhesive strip on the second region of the circuit board of the light bar.

At S132, remove part of the adhesive strip to divide the adhesive strip into multiple adhesive portions which serve as the adhesive layer.

Figure 12:
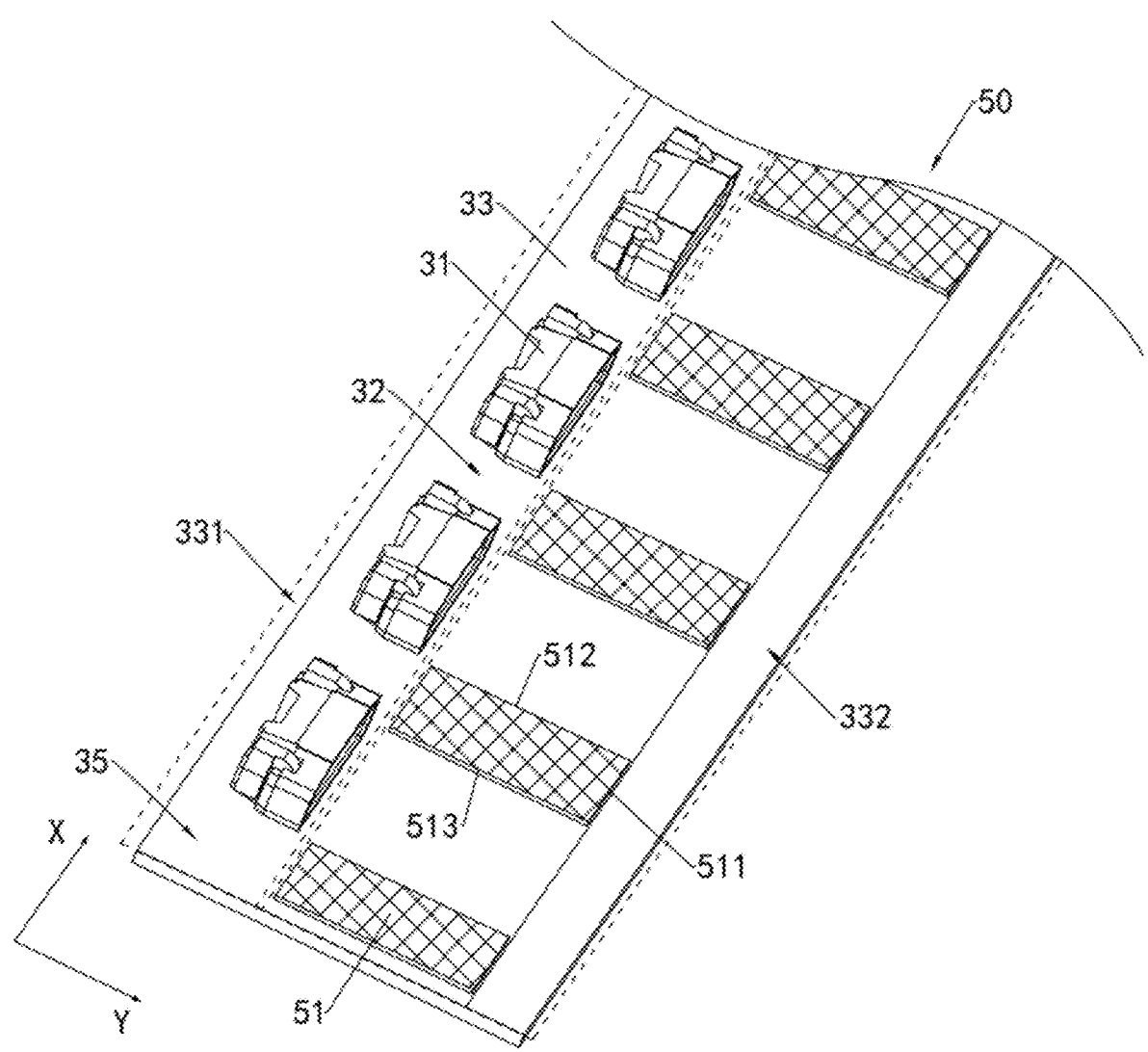
FIGS. 12 and 13 are schematic diagrams illustrating part of an assembly process of the assembly method illustrated in FIG. 11.

Specifically, refer to FIG. 12, in some embodiments, when the adhesive layer 50 is fixed on the second region 332, the multiple adhesive portions 51 are disposed in a one-to-one correspondence with the gaps 32 among the multiple light sources 31 and the gaps 35 among the light sources 31 and the circuit board 33.

It can be understood that, since the light sources of the backlight module of the disclosure are side-incident light sources, the light sources emit light rays toward the second direction. When the adhesive layer 50 covers the entire second region 332, part of the light rays emitted from the light sources 31 will be blocked by the adhesive layer 50 due to a certain thickness of the adhesive layer 50. As a result, the light rays emitted from the light sources cannot all enter the light-guide plate, and thus the entire backlight module has a brightness loss of about 20%. In the assembly method of the disclosure, the adhesive layer 50 is divided to form the multiple adhesive portions 51 arranged at intervals, and the multiple adhesive portions 51 are arranged to face the gaps 32 among the light sources 31 and the gaps 35 among the light sources 31 and both ends of the circuit board 33 in a one-to-one correspondence, avoiding the light rays emitted from the light sources 31 from being blocked. In other words, the adhesive portions 51 are all arranged in regions outside transmission regions where the light rays emitted from the light sources 31 pass, such that the adhesive layer 50 will not affect incidence of the light rays emitted from the light sources 31, effectively reducing the brightness loss of the backlight module, and improving the optical quality of the product.

Figure 13:
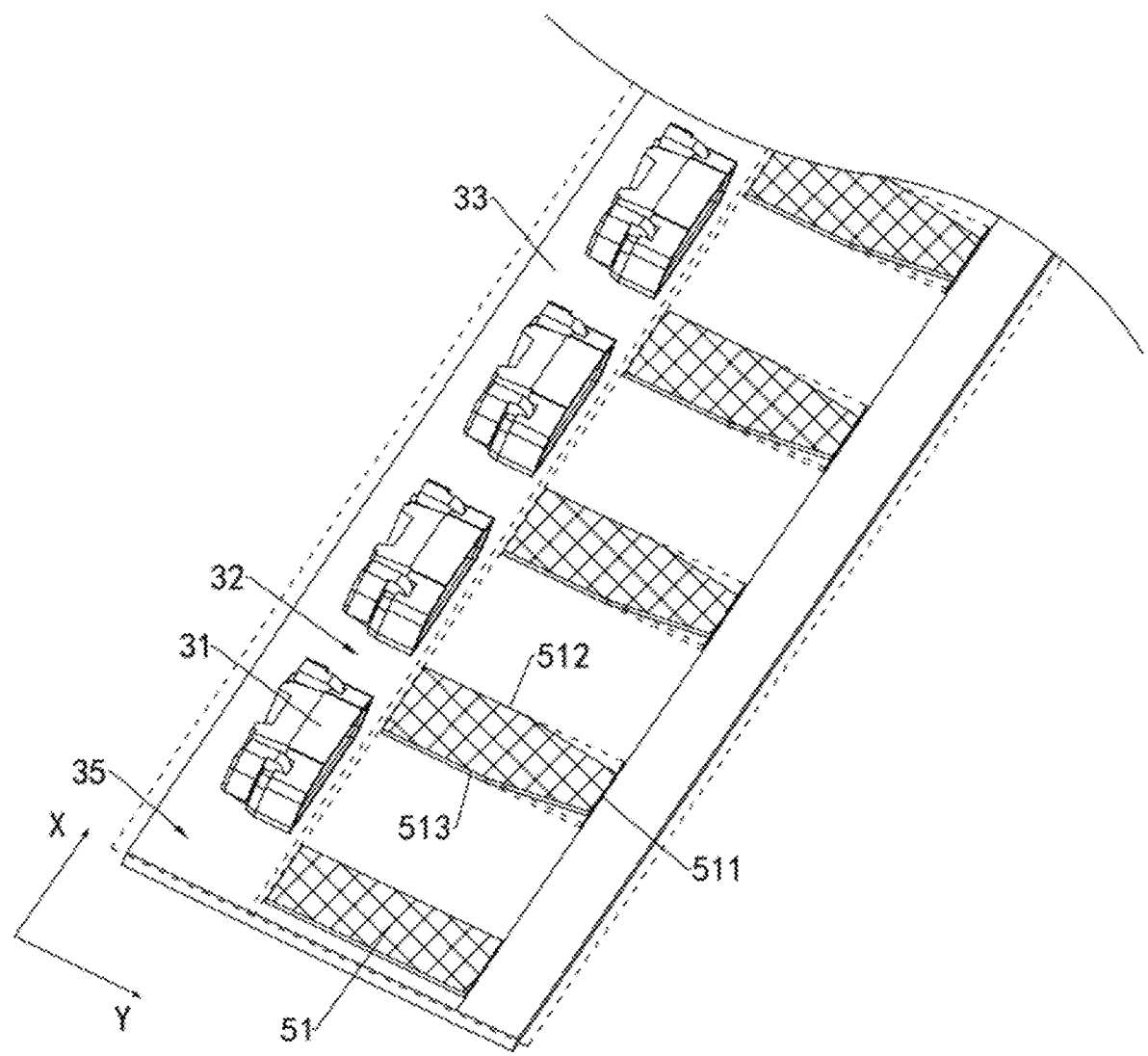

Each of the adhesive portions 51 has a second side 512, a first side 511, and a third side 513 connected in sequence. The first side 511 is a side of the adhesive portion 51 away from the light source, and the second side 512 is opposite to the third side 513. In some embodiments, a chamfer is formed at a connection between the first side 511 and the second side 512, and a chamfer is formed at a connection between the first side 511 and the third side 513. Here, the adhesive portion 51 with the chamfers is in a shape of polygon (as illustrated in FIG. 13). It is noted that, according to different arrangements of the light sources 31 on the circuit board 33, each of the adhesive portions 51 may be chamfered, or part of the adhesive portions 51 may be chamfered. In a case that the light source 31 at both ends in the first direction is relatively close to the edges of the circuit board 33, the adhesive portion 51 formed at this gap has a relative narrow width, and thus in order to ensure a bonding efficiency of the adhesive portion 51, it is not necessary to chamfer the adhesive portion 51.

In an implementation, forming the adhesive layer 50 may include forming a chamfer at a connection between the first side 511 and the second side 512 of the adhesive portion 51, and forming a chamfer at a connection between the first side 511 and the third second of the adhesive portion 51.

It can be understood that, a light-emitting surface of the light source 31 is roughly fan-shaped and has an angle, thus the connection between the first side 511 and the second side 512 of the adhesive portion 51 and the connection between the first side 511 and the third side 513 of the adhesive portion 51 are chamfered according to specific shapes of the different light-emitting surfaces of the light source 31 of different models, such that edges of the adhesive portion 51 fits better with the light-emitting surface, which is beneficial to further reducing the effect of the adhesive layer 50 on the incidence of light rays emitted from the light sources 31 and further reducing the brightness loss of the backlight module.

It is noted that, in the assembly process, the adhesive portion 51 formed after removing part of the adhesive strip may be the adhesive portion 51 that is to be chamfered, or the adhesive portion 51 that has been chamfered. In other words, the adhesive portion 51 may be chamfered in S132. Chamfering of the adhesive portion 51 is not limit herein.

Figure 14:
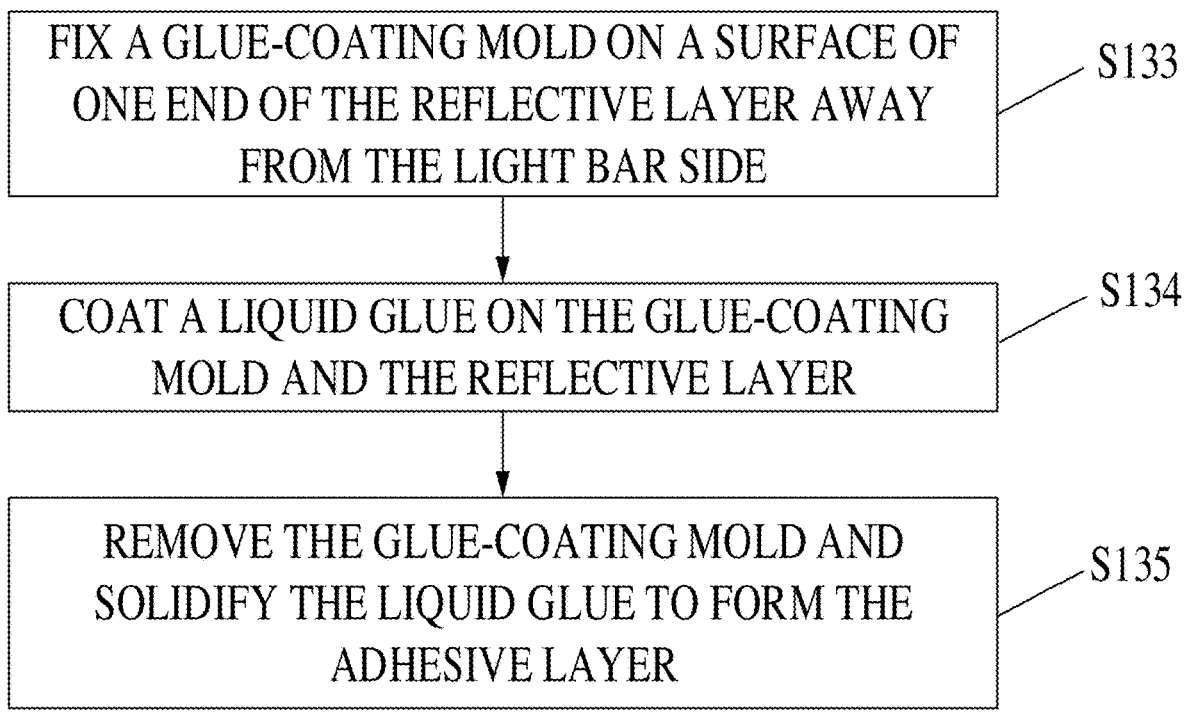
FIG. 14 is a schematic flow chart of the assembly method illustrated in FIG. 10A in other embodiments.

Refer to FIG. 14, which is a schematic flow chart of S130 of the assembly method illustrated in FIG. 10A in other embodiments.

In other embodiments, at S130, disperse the adhesive on the light bar to form the adhesive layer. S130 can also begin at S133.

At S133, fix a glue-coating mold on a surface of one end of the reflective layer away from the light bar side.

Figure 15:
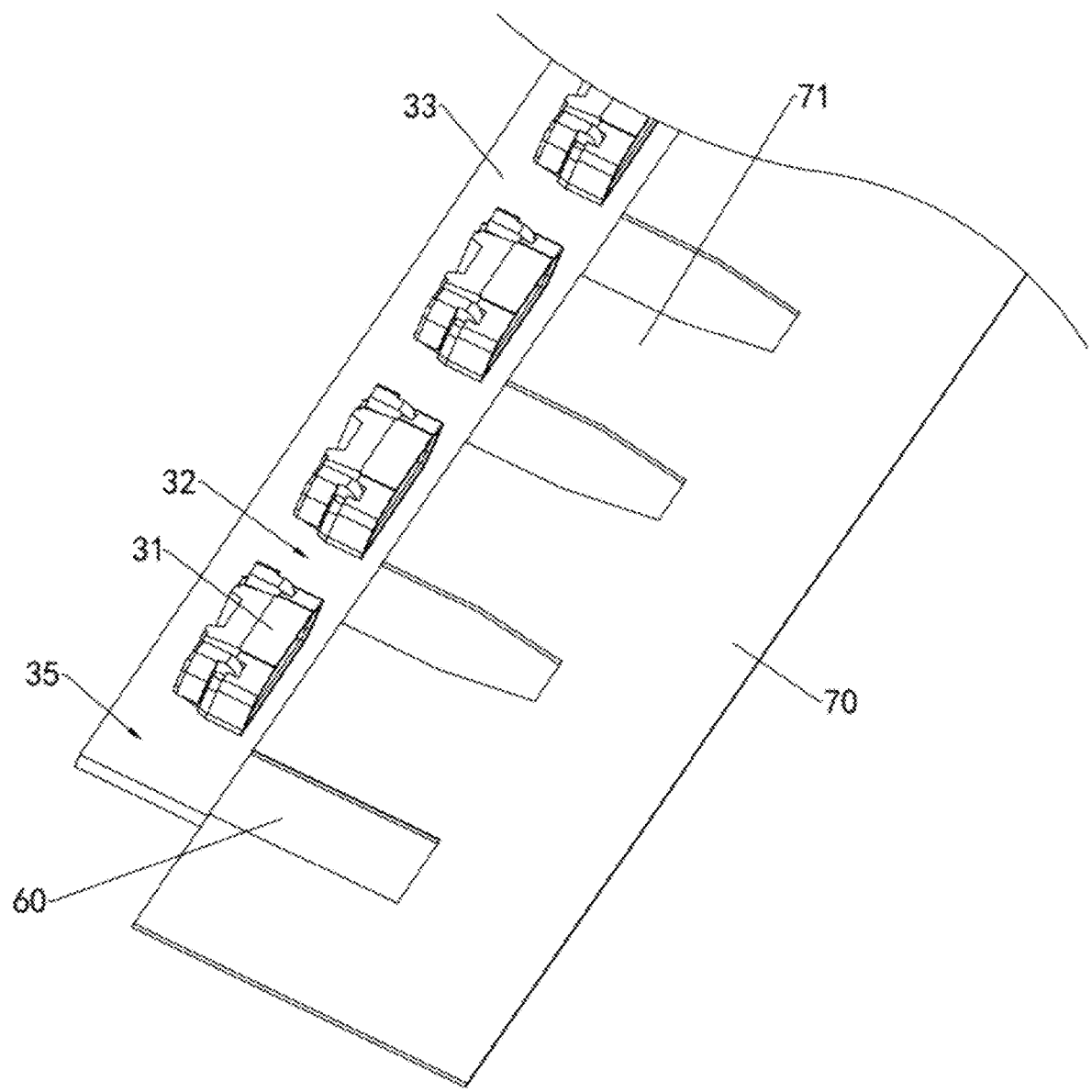
FIGS. 15-17 are schematic diagrams illustrating part of an assembly process of the assembly method illustrated in FIG. 14.

Specifically, refer to FIG. 15, the glue-coating mold 70 has multiple first grid teeth 71 arranged at intervals. When the glue-coating mold 70 is fixed on the surface of one end of the reflective layer 60 away from the light bar 30, the multiple first grid teeth 71 are arranged to face the multiple light sources 31 in a one-to-one correspondence. In an example, the first grid teeth 71 may be in a shape of rectangle or a non-regular shape according to requirements, so that the adhesive portion 51 formed subsequently has a shape of rectangle or polygon.

At S134, coat a liquid glue on the glue-coating mold and the reflective layer.

Figure 16:
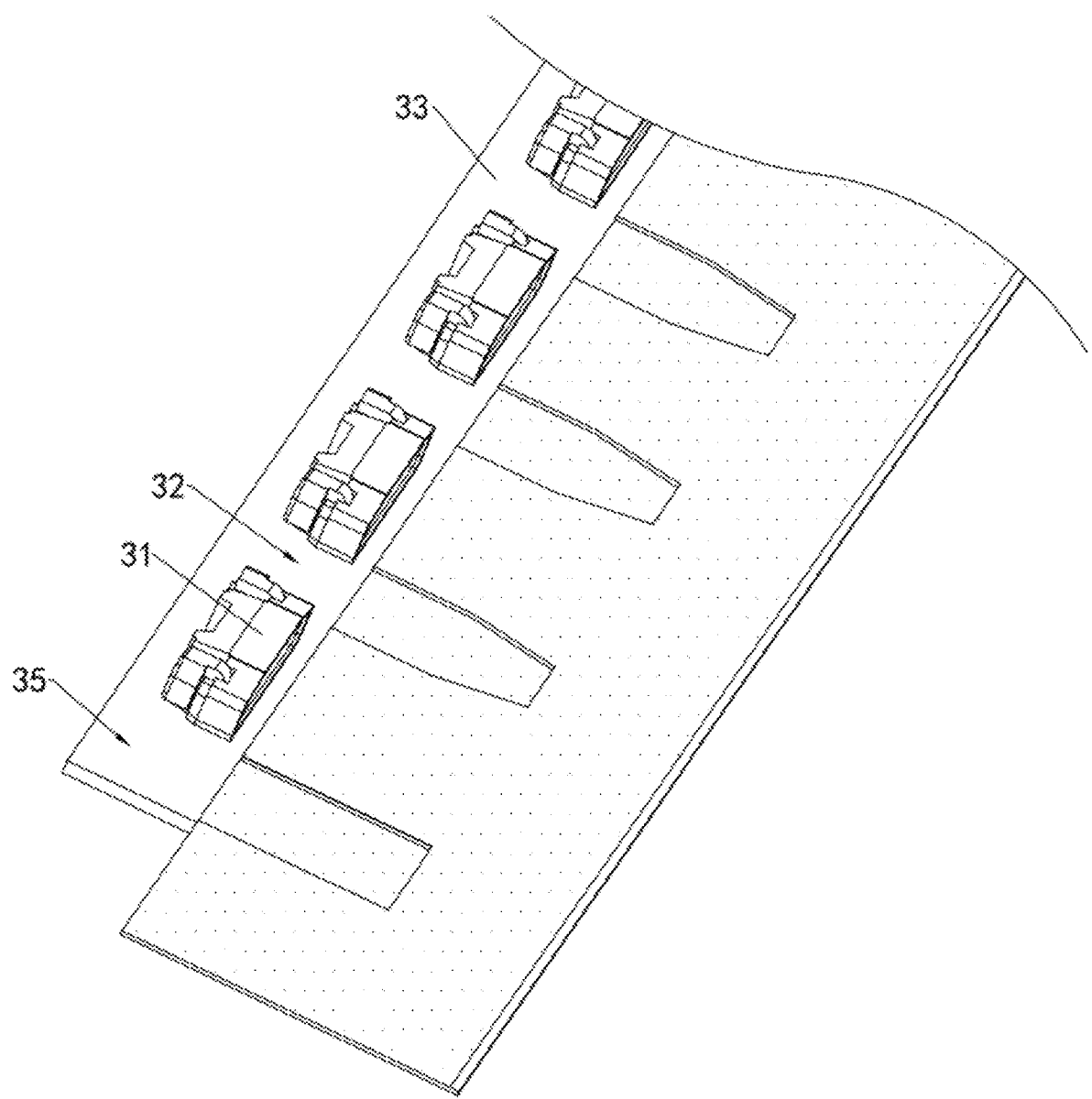

Specifically, refer to FIG. 16, when coating the liquid glue on the glue-coating mold 70, with aid of the first grid teeth 71, part of the liquid glue will be coated on a surface of part of the reflective layer 60 exposed from the first grid teeth 71, and another part of the liquid glue will be coated on a surface of the glue-coating mold 70.

At S135, remove the glue-coating mold and solidify the liquid glue to form the adhesive layer 50.

Figure 17:
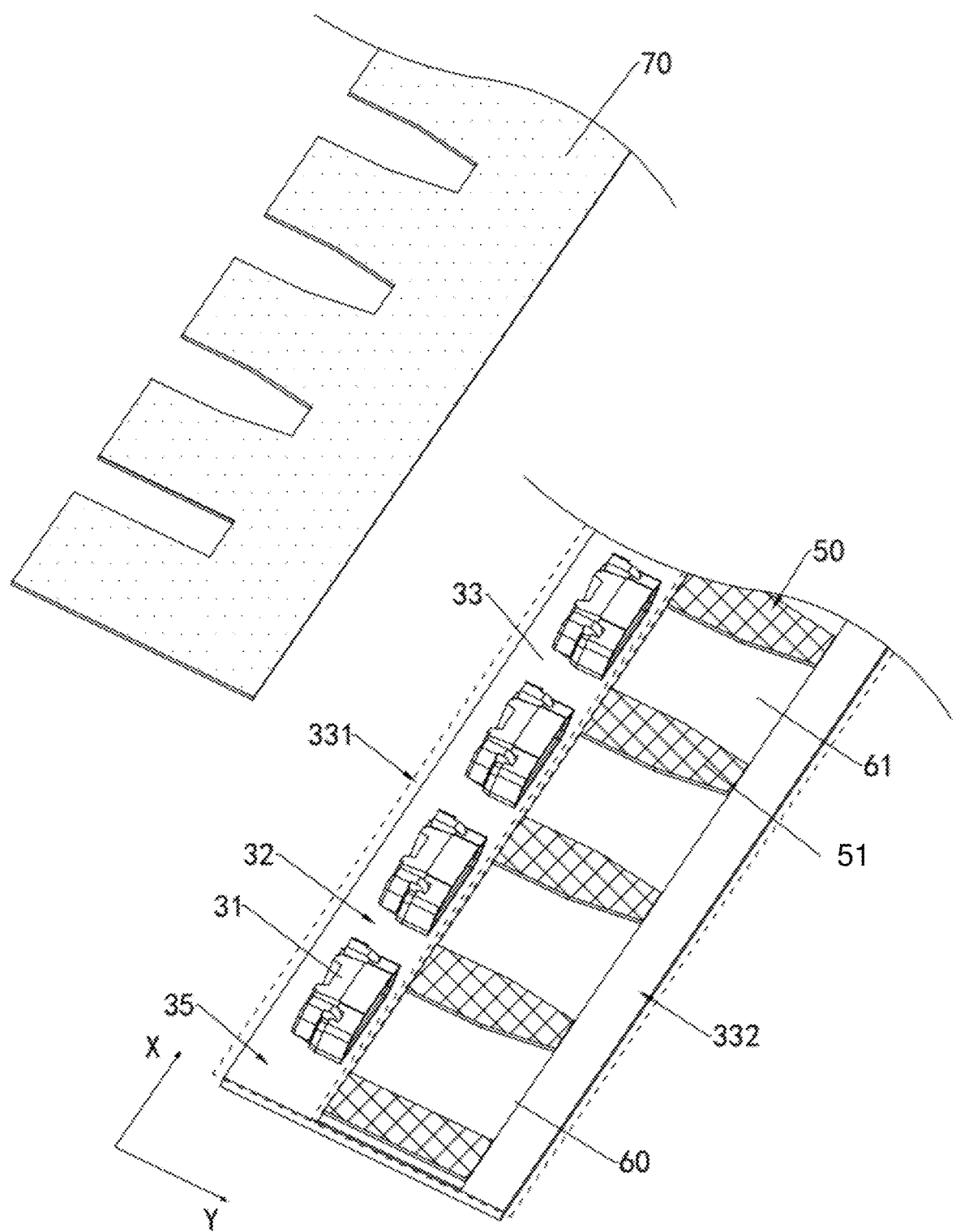

Specifically, refer to FIG. 17, after the glue-coating mold 70 is removed, the liquid glue coated on the surface of the glue-coating mold 70 is then removed, and the liquid glue remaining on the reflective layer 60 forms the multiple adhesive portions 51 arranged at intervals, and the multiple adhesive portions 51 serve as the adhesive layer 50, and the adhesive layer 50 is fixed on the reflective layer 60.

In some embodiments, the adhesive layer 50 may also be embossed to form the adhesive layer 50 with embossing after the glue-coating mold 70 is removed.

It can be understood that, in the assembly method of the disclosure, the reflective layer 60 is disposed between the circuit board 33 of the light bar 30 and the adhesive layer 50, and the multiple adhesive portions 51 of the adhesive layer 50 are arranged to face the gaps 32 among the multiple light sources 31 and the gaps 35 among the light sources 31 and the circuit board 33 in a one-to-one correspondence, such that part of the reflective layer 60 is exposed out between each of two adjacent adhesive portions 51. Since the reflective layer 60 has a white surface, part of the light rays emitted from the light source 31 can be reflected by the reflective layer 60 to enter the light-guide plate 40, which effectively reduces the brightness loss of the backlight module 100 and is beneficial to improving the optical quality of the product.

In some embodiments, the reflective layer 60 may also include multiple reflective blocks 61. The multiple reflective blocks 61 are arranged in the first direction. The multiple reflective blocks 61 face the multiple light sources 31 in a one-to-one correspondence. Here, the reflective layer 60 is a coating layer which is intermittently disposed. In a case that the reflective layer 60 is a coating layer which is intermittently disposed, equipment for coating the reflective layer 60 is a mold having multiple second grid teeth corresponding to the reflective layer 60. When mounting the mold, the multiple second grid teeth of the mold face the multiple light sources 31 in a one-to-one correspondence, such that the multiple reflective blocks 61 can be formed subsequently to face the multiple light sources 31 in a one-to-one correspondence. It is noted that, depending on different shapes and sizes of the formed reflective blocks 61, the adhesive layer 50 may cover both part of the reflective blocks 61 and part of the circuit board 3, or cover only part of the circuit board 33. A specific structure of the reflective layer 60 is not limited herein.

Figure 18:
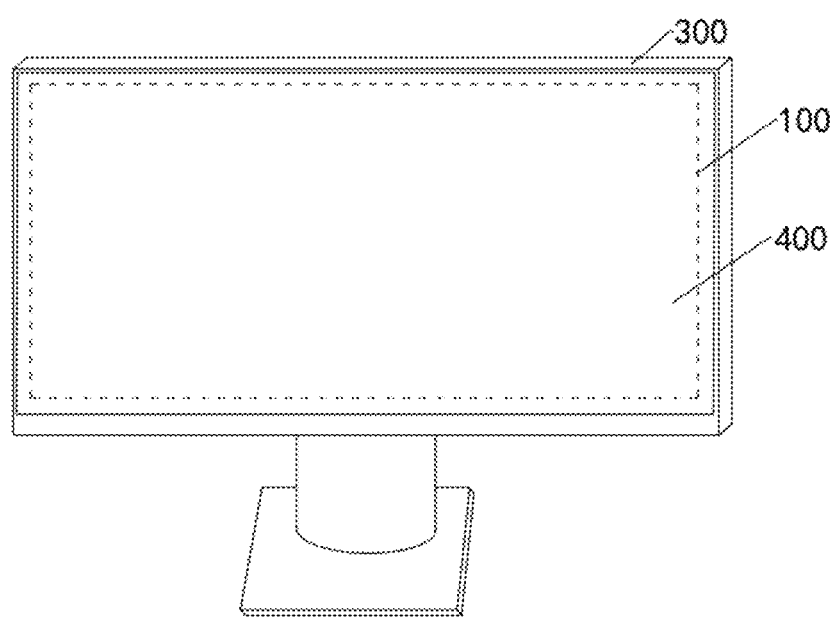
FIG. 18 is a schematic structural view of a display device provided in the disclosure.

Refer to FIG. 18, which is a schematic structural diagram of a display device 1000 provided in the disclosure.

The display device 1000 may be a display device 1000 of an electronic device with a display function, such as a computer, a mobile phone, a TV, and a tablet. In the embodiments of the disclosure, for example, the display device 1000 is a computer, which is described in detail herein.

In this embodiment, the display device 1000 includes a housing 300, a display panel 400, and a backlight module 100. Both the display panel 400 and the backlight module 100 are disposed inside the housing 300. The display panel 400 is disposed on a light-emitting side of the backlight module 100. A surface of the display panel 400 away from the backlight module 100 is exposed from the housing 300 to display images.

Figure 19:
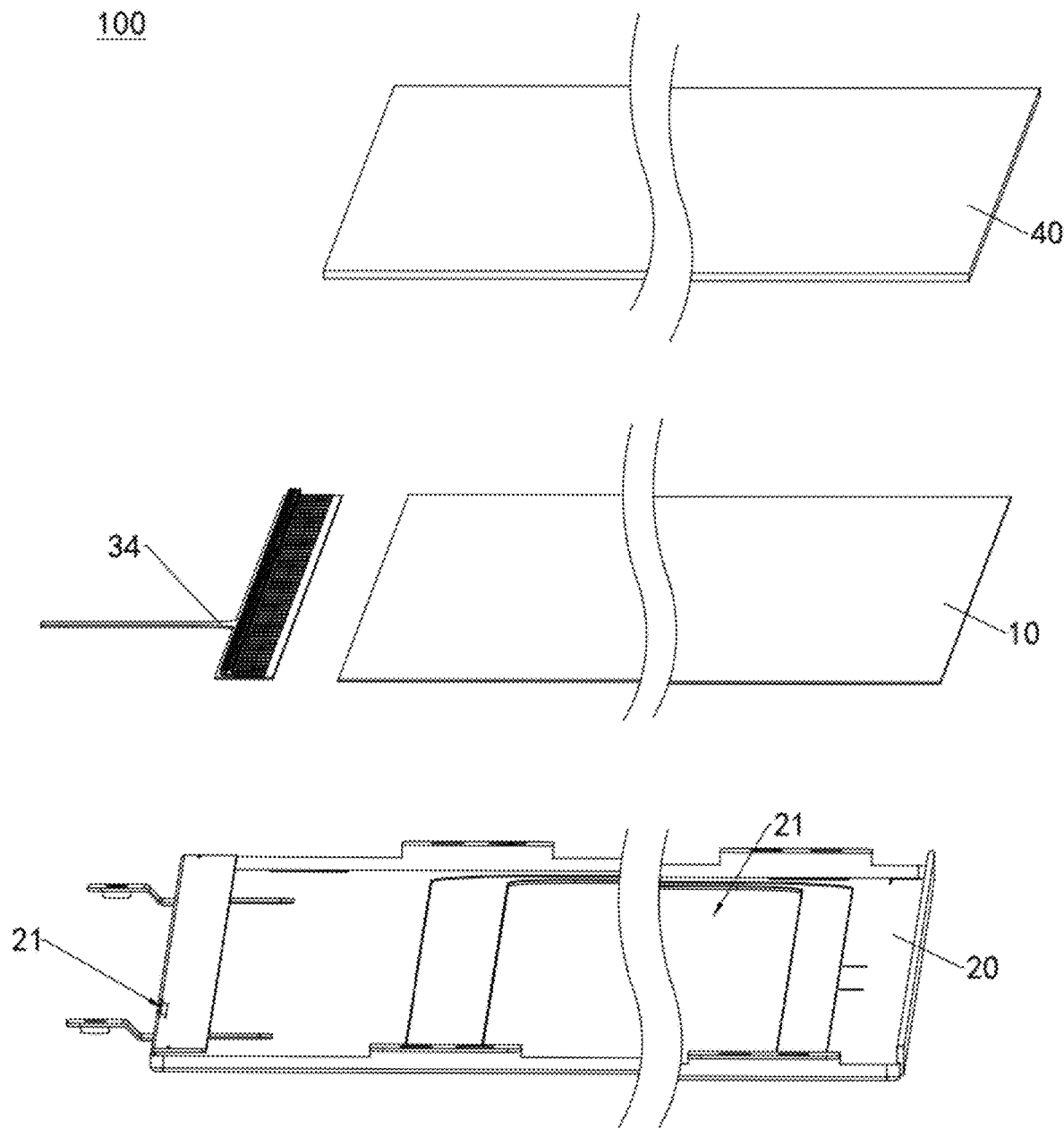
FIG. 19 is an exploded schematic structural view of a backlight module of the display device illustrated in FIG. 18.
Figure 20:
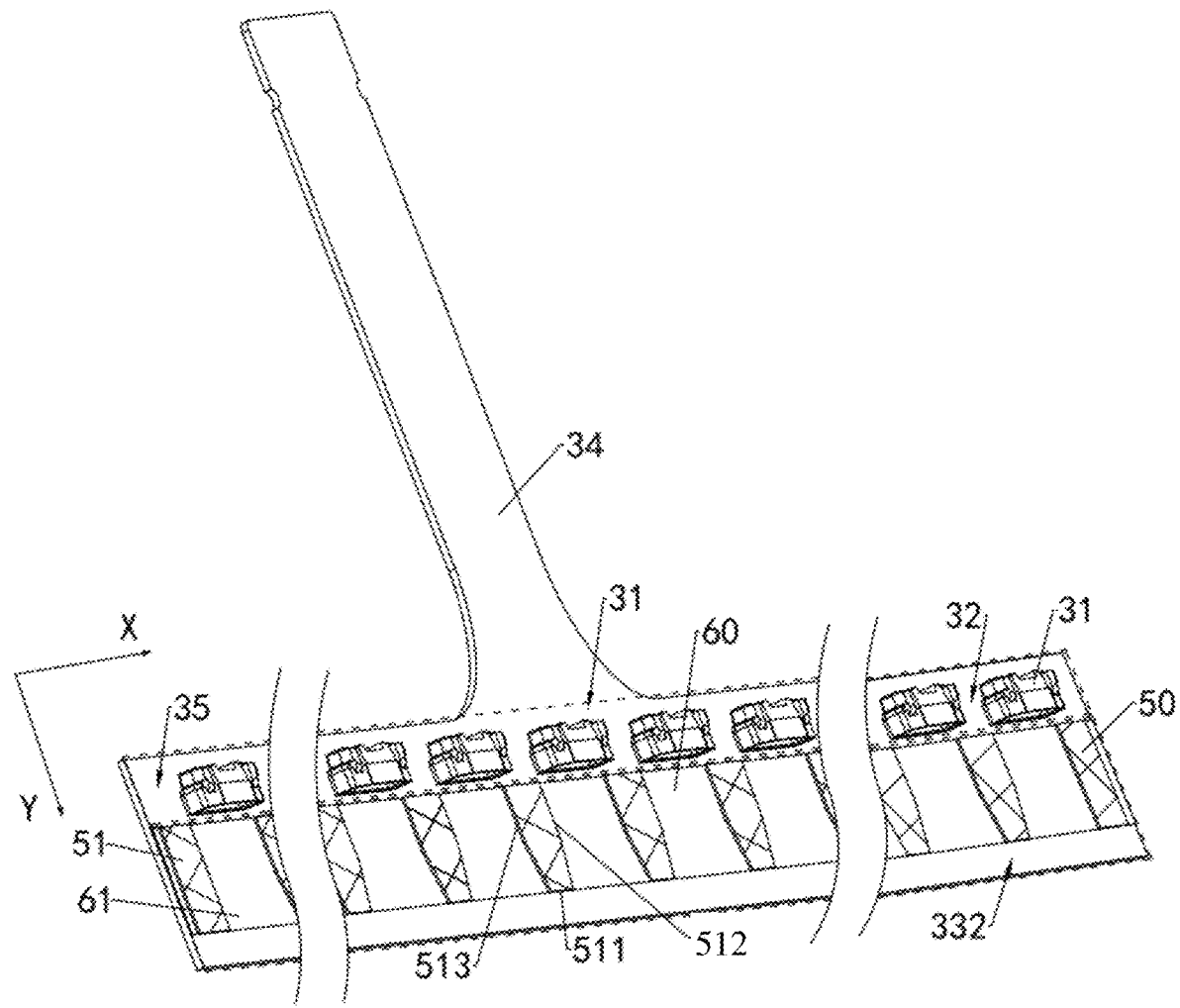
FIG. 20 is a partial schematic structural view of the backlight module illustrated in FIG. 19.
Figure 21:
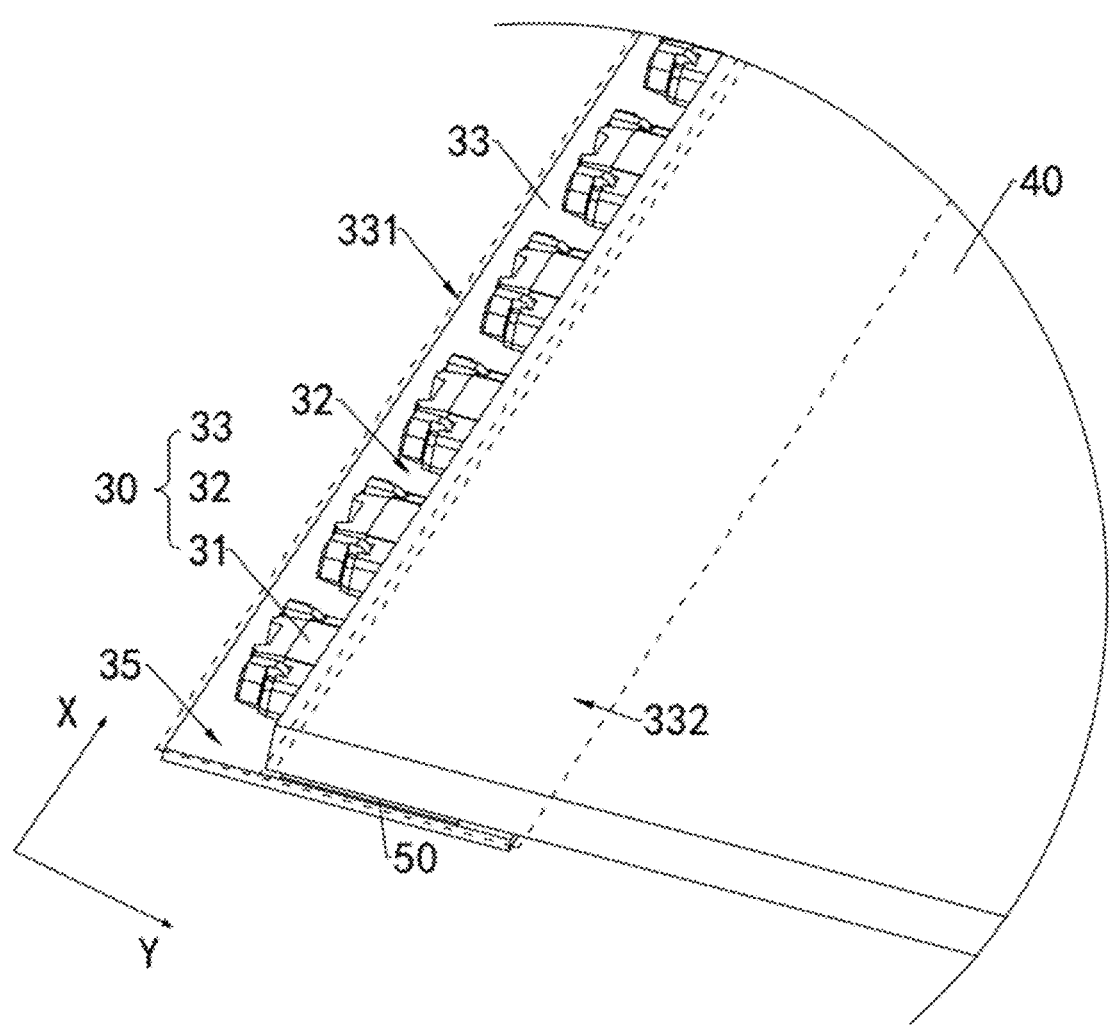
FIG. 21 is a partial schematic structural view of the backlight module illustrated in FIG. 19.

Refer to FIGS. 19-21, where FIG. 19 is an exploded schematic structural view of the backlight module 100 of the display device 1000 illustrated in FIG. 18, FIG. 20 is a partial schematic structural view of the backlight module 100 illustrated in FIG. 19, and FIG. 21 is a partial schematic structural view of the backlight module 100 illustrated in FIG. 19.

In this embodiment, the backlight module 100 can be assembled through the above-mentioned assembly method of the backlight module. In this embodiment, the backlight module 100 may include a backplane 20, a light bar 30, a light-guide plate 40, a reflective sheet 10, and an adhesive layer 50. The reflective sheet 10 is fixed on the first side 22 of the backplane 20. The light bar 30 includes a circuit board 33 and multiple light sources 31. The circuit board 33 may has a first region 331 and a second region 332 connected with the first region 331. The circuit board 33 extends in a first direction (that is, X direction). A width direction of the circuit board 33 is a second direction (that is, Y direction). The first region 331 and the second region 332 are arranged in the second direction. The multiple light sources 31 are arranged in the first direction and are all fixed on the first region 331 of the circuit board 33. In an example, each two adjacent light sources 31a define a gap 32 therebetween. Each of the light sources 31 at both ends in the first direction and an edge of a corresponding one of both ends of the circuit board 33 in the first direction define a gap 35 therebetween. The adhesive layer 50 is fixed on the second region 332 of the circuit board 33. The light-guide plate 40 is at least partially fixed on the second region 332 via the adhesive layer 50.

The backplane 20 may define a jack 21. The light bar 30 is provided with a plug wire 34 at a side of the first region 331 of the light bar 30 away from the second region 332. The plug wire 34 is inserted into the jack 21 to mount the light bar 30 and light-guide plate 40 as a whole to a first side 22 of the backplane 20. In an example, the reflective sheet 10 is between the backplane 20 and the light-guide plate 40, and the light bar 30 and the light-guide plate 40 constitute a lamp-guide assembly.

It can be understood that, in the backlight module 100 of the disclosure, the light bar 30 and the light-guide plate 40 are fixed together to form the lamp-guide assembly. As such, during an automatic assembly process, the light bar 30 and the light-guide plate 40 can be moved as a whole by a sucker, and then be tilted at an angle to be mounted on the backplane 20. The light-guide plate 40 has a relatively hard texture and high strength, thus when the sucker suctions up the light-guide plate 40 to suction up the lamp-guide assembly, the lamp-guide assembly is not easy to deform, which allows the lamp-guide assembly to have a controllable tilt angle when being tilted under the control of the sucker, and more accurate alignment is achieved, so that the plug wire 34 of the lam-guide assembly can be accurately inserted into the jack 21 of the backplane 20, which is beneficial to improving the product yield. In other words, in the backlight module 100 of the disclosure, fixing and connecting relations among the light bar 30, the reflective sheet 10, and the light-guide plate 40 are changed, such that the assembly method of the backlight module 100 of the disclosure is simplified, the reflective sheet 10 and the lamp-guide assembly are mounted on the backplane 20 with aid of the sucker 200, which has a high assembly yield and meets requirements of automatic assembly, and thus a problem of a low optical quality of the backlight module 100 caused during an automatic assembly process is effectively avoided, product optimization is realized, and production efficiency is further improved.

In some embodiments, the adhesive layer 50 can have embossing, which can effectively prevent the adhesive layer 50 from being squeezed and gathered together by the light-guide plate 40 when fixing the light-guide plate 40 and the light bar 30, and avoid an uneven thickness and an uneven surface of the adhesive layer 50, which is beneficial to improving the fixing strength of the light-guide plate 40 and the product yield. In an example, the embossing may be in a shape of horizontal bars, vertical bars, or rhombus. A shape of the embossing of the adhesive layer 50 is not limited herein.

Figure 22:
FIG. 22 illustrates schematic structural views of an adhesive layer of the backlight module illustrated in FIG. 19 in different cases where light sources have different specifications.
Figure 22:
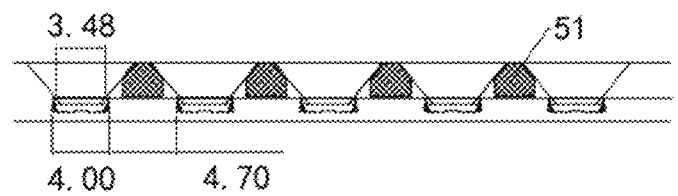
Figure 22:
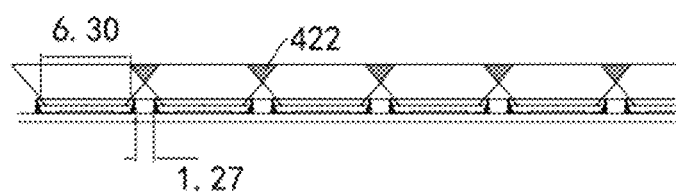

Refer to FIG. 20 and FIG. 22, where FIG. 22 illustrates schematic structural views of the adhesive layer 50 of the backlight module 100 illustrated in FIG. 19 in different cases where the light sources 31 have different specifications.

In this embodiment, the adhesive layer 50 may have multiple adhesive portions 51 arranged at intervals. The multiple adhesive portions 51 face the multiple gaps 32 in a one-to-one correspondence. Each of the multiple adhesive portions 51 has a second side 512, a first side 511, and a third side 513 connected in sequence. The first side 511 is a side of the adhesive portion 51 away from the light source 31. The second side 512 is opposite to the third side 513. A chamfer is formed at a connection between the first side 511 and the second side 512, and a chamfer is formed at a connection between the first side 511 and the third side 513. Here, the adhesive portion 51 after being chamfered is in a shape of polygon.

It can be understood that, on the one hand, the light sources 31 of the backlight module 100 of the disclosure are side-incident light sources, thus the light sources 31 are configured to emit light rays toward the second direction. When the adhesive layer 50 covers the entire second region 332, part of the light rays emitted from the light sources 31 will be blocked by the adhesive layer 50 due to a certain thickness of the adhesive layer 50. As a result, the light rays emitted by the light sources 31 cannot all enter the light-guide plate, and thus the entire backlight module 100 has a brightness loss of about 20%. In the backlight module 100 of the disclosure, the adhesive layer 50 has the multiple adhesive portions 51 arranged at intervals, and the multiple adhesive portions 51 are arranged to face the gaps 32 among the light sources 31 and the gaps 35 among the light sources 31 and both ends of the circuit board 33 in a one-to-one correspondence. In other words, the adhesive portions 51 are all arranged in regions outside light-emitting regions 421 of the light sources 31, such that the adhesive layer 50 will not affect incidence of the light rays emitted from the light sources 31, effectively reducing the brightness loss of the backlight module 100, and improving the optical quality of the product.

On the other hand, a light-emitting region 421 of the light source 31 is roughly fan-shaped, and thus in order to better avoid the light rays of the light sources 31 from being blocked, the adhesive portion 51 needs to be chamfered, such that edges of the adhesive portion 51 fits better with edges of the light emitting region 421 of the light source 31, and the light rays of the light source 31 can be further avoided from being blocked.

It is noted that, the light-emitting regions 421 of the two adjacent light sources 31 may have an overlapping region 422, the light-emitting regions 421 of the light sources 31 of different specifications are different in shape and area, and gaps 32 among the light sources 31 of different specifications are also different, thus an overlapping area of the light emitting regions 421 of two adjacent light sources 31 will vary along with variation of the above factors. As such, the adhesive portion 51 needs to be cut or chamfered according to the overlapping area of the light-emitting regions 421 of the light sources 31 of different specifications and the gap 32 between two adjacent light sources 31, such that the adhesive portion 51 can be changed in shape to have edges which fit better with edges of the light-emitting region 421. In an example, the adhesive portion 51 may also be in a shape of triangle, trapezoid, or rectangle. The shape of the adhesive portion 51 is not limited herein.

Exemplary, as illustrated in FIG. 22, each of the light sources 31 is a LED. In a case that the LED has a length of 3.8 mm and a width of 0.6 mm, the light-emitting region 421 has an exposed part which has a length of 3.2 mm. If a gap 32 between two adjacent LEDs has a width of 2.9 mm, the light-emitting regions 421 of the two adjacent LEDs partially overlap, and an overlapping area is small. Here, the adhesive portion 51 is cut, and the cut adhesive portion 51 is roughly triangular, and has a small area.

In a case that the LED has a length of 4 mm and a width of 1.4 mm, the light-emitting region 421 has an exposed part which has a length of 3.48 mm. If the gap 32 between two adjacent LEDs has a width of 4.7 mm, the light-emitting regions 421 of the two adjacent LEDs not overlap with each other, that is, the overlapping area is zero. Here, a chamfer is formed at the connection between the first side and the second side of the adhesive portion 51 and a chamfer is formed at the connection between the first side and the third side of the adhesive portion 51, and the adhesive portion 51 after chamfering is roughly polygonal and has a large area.

In a case that the LED has a length of 7 mm and a width of 2 mm, the light-emitting region 421 has an exposed part which has a length of 6.3 mm. If the gap 32 between two adjacent LEDs is 1.27 mm, an overlap between the light-emitting regions 421 of the two adjacent LEDs is relatively large, and thus the overlapping area is relatively large. Here, in addition to cutting the adhesive portion 51 to form a triangular-shaped adhesive portion 51 with a reduced area, the adhesive layer 50 can also completely cover the entire second region 332 to improve a bonding efficiency.

Figure 23:
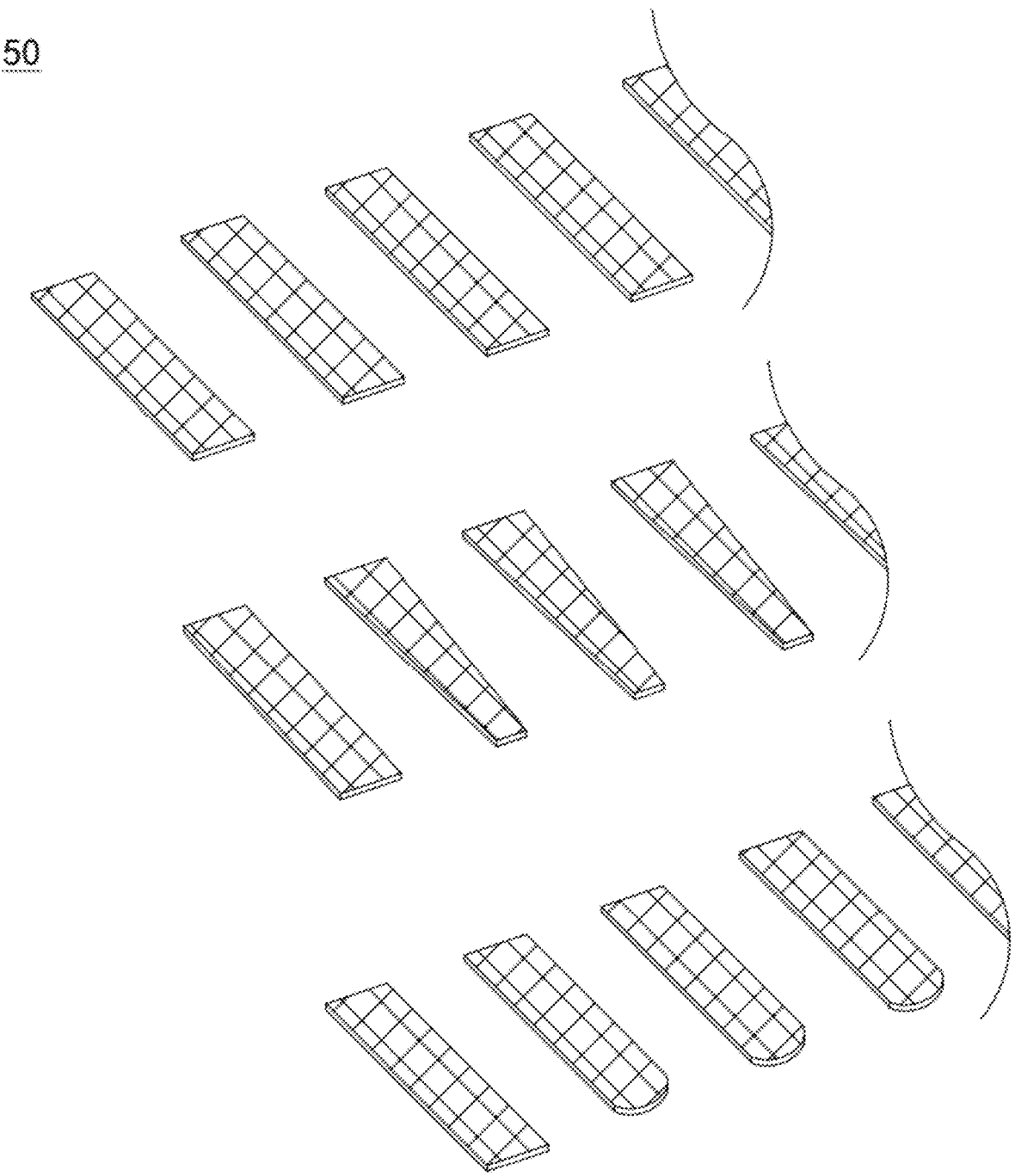
FIG. 23 is a schematic structural view of the adhesive layer illustrated in FIG. 22 in other embodiments.

Of course, in other embodiments, the adhesive portion 51 can also be cut into a rectangle, a trapezoid, or other shapes (as illustrated in FIG. 23), aiming at realizing a bonding function without affecting a luminous efficiency of the light source 31, which are not limited herein.

Refer to FIG. 20 and FIG. 21, in some embodiments, the backlight module 100 may also include a reflective layer 60. The reflective layer 60 is fixed on the second region 332 of the circuit board 33 and extends in the first direction. The adhesive layer 50 is fixed on the reflective layer. In an embodiment, the reflective layer 60 is a plastic film, and the reflective layer 60 has a color of white. Here, an overall thickness of the reflective layer 60 and the adhesive layer 50 is between 0.03 mm and 0.05 mm.

It can be understood that, in the backlight module 100 of the disclosure, the reflective layer 60 is disposed between the second region 332 of the circuit board 33 and the adhesive layer 50, and the multiple adhesive portions 51 of the adhesive layer 50 are arranged to face the gaps 32 among the multiple light sources 31 and the gaps 35 among the light sources 31 and the circuit board 33 in a one-to-one correspondence, such that part of the reflective layer 60 is exposed out between each of two adjacent adhesive portions 51. Since the reflective layer 60 has a color of white, part of the light rays emitted from the light source 31 can be reflected by the reflective layer 60 to enter the light-guide plate 40, which effectively reduces the brightness loss of the backlight module 100 and is beneficial to improving the optical quality of the product.

In some embodiments, the reflective layer 60 can also include multiple reflective blocks 61. The multiple reflective blocks 61 are arranged in the first direction. The multiple reflective blocks 61 face the multiple light sources 31 in a one-to-one correspondence. Here, depending on different shapes and sizes of the formed reflective blocks 61, the adhesive layer 50 may cover both part of the reflective blocks 61 and part of the circuit board 3, or cover only part of the circuit board 33. A specific structure of the reflective layer 60 is not limited herein.

While the disclosure has been described in detail above with reference to the exemplary embodiments, the scope of the disclosure is not limited thereto. As will occur to those skilled in the art, the disclosure is susceptible to various modifications and changes without departing from the scope of the disclosure. Therefore, the scope of the disclosure should be determined by the scope of the claims.

What is claimed is:

1. A backlight module, comprising a backplane, a light bar, a light-guide plate, a reflective sheet fixed on a first side of the backplane, and an adhesive layer, wherein the light bar comprises a circuit board and a plurality of light sources, wherein the circuit board has a first region and a second region connected with the first region, and the plurality of light sources are all fixed on the first region, the adhesive layer is fixed on the second region, and the light-guide plate is at least partially fixed on the second region via the adhesive layer;

the light bar and the light-guide plate are both mounted on the first side of the backplane, and the reflective sheet is between the backplane and the light-guide plate; and the backlight module further comprises a reflective layer disposed between the circuit board of the light bar and the adhesive layer, wherein the reflective layer is configured to reflect part of light rays emitted from the plurality of light sources to enter the light-guide plate.

2. The backlight module of claim 1, wherein the circuit board extends in a first direction, the plurality of light sources are arranged in the first direction, and each two adjacent light sources in the plurality of light sources define a gap therebetween to form a plurality of gaps; and the adhesive layer has a plurality of adhesive portions arranged in the first direction, and the plurality of adhesive portions face the plurality of gaps in a one-to-one correspondence.

3. The backlight module of claim 2, wherein the adhesive portion has a second side, a first side, and a third side connected in sequence, wherein the first side is a side of the adhesive portion away from the light source, and the second side is opposite to the third side; and a chamfer is formed at a connection between the first side and the second side, and a chamfer is formed at a connection between the first side and the third side.

4. The backlight module of claim 2, wherein the adhesive portion is in a shape of triangle, polygon, trapezoid, or rectangle.

5. The backlight module of claim 2, wherein the reflective layer is fixed on the second region of the circuit board and extends in the first direction, and the adhesive layer is fixed on the reflective layer.

6. The backlight module of claim 2, wherein the reflective layer has a plurality of reflective blocks, wherein the plurality of reflective blocks are arranged in the first direction, and the plurality of reflective blocks face the plurality of light sources in a one-to-one correspondence.

7. The backlight module of claim 5, wherein the adhesive layer and the reflective layer together have a thickness ranging from 0.03 mm to 0.05 mm.

8. A display device, comprising a display panel and a backlight module, the display panel being disposed on a light-emitting side of the backlight module, the backlight module comprising a backplane, a light bar, a light-guide plate, a reflective sheet fixed on a first side of the backplane, and an adhesive layer, wherein the light bar comprises a circuit board and a plurality of light sources, wherein the circuit board has a first region and a second region connected with the first region, and the plurality of light sources are all fixed on the first region, the adhesive layer is fixed on the second region, and the light-guide plate is at least partially fixed on the second region via the adhesive layer;

the light bar and the light-guide plate are both mounted on the first side of the backplane, and the reflective sheet is between the backplane and the light-guide plate; and the backlight module further comprises a reflective layer disposed between the circuit board of the light bar and the adhesive layer, wherein the reflective layer is configured to reflect part of light rays emitted from the plurality of light sources to enter the light-guide plate.

9. The display device of claim 8, wherein
the circuit board extends in a first direction, the plurality of light sources are arranged in the first direction, and each two adjacent light sources in the plurality of light sources define a gap therebetween to form a plurality of gaps; and
the adhesive layer has a plurality of adhesive portions arranged in the first direction, and the plurality of adhesive portions face the plurality of gaps in a one-to-one correspondence.

10. The display device of claim 9, wherein
the adhesive portion has a second side, a first side, and a third side connected in sequence, wherein the first side is a side of the adhesive portion away from the light source, and the second side is opposite to the third side; and
a chamfer is formed at a connection between the first side and the second side, and a chamfer is formed at a connection between the first side and the third side.

11. The display device of claim 9, wherein the adhesive portion is in a shape of triangle, polygon, trapezoid, or rectangle.

12. The display device of claim 9, wherein
the reflective layer is fixed on the second region of the circuit board and extends in the first direction, and the adhesive layer is fixed on the reflective layer; or
the reflective layer has a plurality of reflective blocks, wherein the plurality of reflective blocks are arranged in the first direction, and the plurality of reflective blocks face the plurality of light sources in a one-to-one correspondence.

13. The display device of claim 12, wherein the adhesive layer and the reflective layer together have a thickness ranging from 0.03 mm to 0.05 mm.

14. An assembly method of a backlight module, comprising:
fixing a reflective sheet on a first side of a backplane;
fixing a reflective layer on a circuit board of a light bar;
forming an adhesive layer on the reflective layer, wherein the reflective layer is disposed between the circuit board of the light bar and the adhesive layer and configured to reflect part of light rays emitted from the plurality of light sources to enter the light-guide plate;
attaching a light-guide plate to the adhesive layer to fix at least part of the light-guide plate on the light bar; and
mounting the light bar and the light-guide plate on the first side of the backplane, the reflective sheet being between the backplane and the light-guide plate.

15. The assembly method of claim 14, wherein
the light bar comprises a plurality of light sources, wherein the circuit board has a first region and a second region connected with the first region, wherein
the assembly method further comprises:
fixing the plurality of light sources on the first region of the circuit board, wherein each two adjacent light sources in the plurality of light sources define a gap therebetween to form a plurality of gaps; and
forming an adhesive layer on the reflective layer comprising forming the adhesive layer on the second region, wherein the adhesive layer comprises a plurality of adhesive portions arranged in a first direction, and the plurality of adhesive portions face the plurality of gaps in a one-to-one correspondence.

16. The assembly method of claim 15, wherein forming the adhesive layer comprises:
forming a chamfer at a connection between a first side and a second side of the adhesive portion, and forming a chamfer at a connection between the first side and a third second of the adhesive portion, wherein the first side is a side of the adhesive portion away from the light source, and the second side is opposite to the third side.

17. The assembly method of claim 15, wherein the adhesive portion is in a shape of triangle, polygon, trapezoid, or rectangle.

18. The assembly method of claim 15,
wherein the reflective layer has a plurality of reflective blocks, wherein the plurality of reflective blocks are arranged in the first direction, and the plurality of reflective blocks face the plurality of light sources in a one-to-one correspondence; and
forming the adhesive layer on the second region comprises forming the adhesive layer on the reflective layer that is fixed on the second region.

19. The assembly method of claim 18, wherein the adhesive layer and the reflective layer together have a thickness ranging from 0.03 mm to 0.05 mm.

\* \* \* \* \*